United States Patent
Aloni et al.

(10) Patent No.: US 7,996,569 B2
(45) Date of Patent: Aug. 9, 2011

(54) METHOD AND SYSTEM FOR ZERO COPY IN A VIRTUALIZED NETWORK ENVIRONMENT

(75) Inventors: Eliezer Aloni, Zur Yigal (IL); Uri El Zur, Irvine, CA (US); Rafi Shalom, Givat Shmuel (IL); Caitlin Bestler, Laguna Hilla, CA (US)

(73) Assignee: Broadcom Israel Research Ltd., Ramat Gan (IL)

( * ) Notice: Subject to any disclaimer, the term of this patent is extended or adjusted under 35 U.S.C. 154(b) by 788 days.

(21) Appl. No.: 11/623,018

(22) Filed: Jan. 12, 2007

(65) Prior Publication Data

US 2007/0162619 A1 Jul. 12, 2007

Related U.S. Application Data

(60) Provisional application No. 60/758,581, filed on Jan. 12, 2006.

(51) Int. Cl.
*G06F 15/16* (2006.01)
*H04L 9/32* (2006.01)

(52) U.S. Cl. ........................... 709/250; 713/176
(58) Field of Classification Search .................. 709/250; 713/176

See application file for complete search history.

(56) References Cited

U.S. PATENT DOCUMENTS

| | | | |
|---|---|---|---|
| 7,478,173 B1 * | 1/2009 | Delco | 709/250 |
| 2003/0126445 A1 * | 7/2003 | Wehrenberg | 713/176 |
| 2006/0010254 A1 * | 1/2006 | Trainin | 709/250 |

OTHER PUBLICATIONS

International Search Report corresponding to International Appln. No. PCT/US2007/000992, dated Jul. 17, 2007, 4 pp.
International Preliminary Report on Patentability corresponding to International Appln. No. PCT/US2007/000992, dated Jul. 24, 2008, 8 pp.
Sugerman, J. et al., Virtualizing I/O Devices on VMware Workstation's Hosted Virtual Machine Monitor, Proceedings of the 2001 USENIX Annual Technical Conference, Boston, MA, Jun. 25, 2001 pp. 1-14, XP-002322825.
Shivam, Piyush et al., EMP: Zero-copy OS-bypass NIC-driven Gigabit Ethernet Message Passing, International Conference for High Performance Computing and Communications, ACM, US, Nov. 16, 2001, pp. 49-56, XP-002360191.
Barham, Paul et al., Xen and the Art of Virtualization, ACM SOSP, Proceedings of the ACM Symposium on Operating Systems Principles, ACM, US, vol. 37, No. 5; Oct. 19, 2003, pp. 164-177; XP-002370804.
Garfinkle, T. et al., Virtual Machine Montors: Current Technology and Future Trends, Computer, IEEE Service Center, Los Alamitos, CA US, vol. 38, No. 5, May 5, 2005, pp. 39-47, XP-011132222.

* cited by examiner

*Primary Examiner* — David E England
*Assistant Examiner* — Mark D Fearer
(74) *Attorney, Agent, or Firm* — McAndrews, Held & Malloy, Ltd.

(57) ABSTRACT

Methods and systems for zero copy in a virtualized network environment are disclosed. Aspects of one method may include a plurality of GOSs that share a single NIC. The NIC may switch communication to a GOS to allow that GOS access to a network via the NIC. The NIC may offload, for example, OSI layer 3, 4, and/or 5 protocol operations from a host system and/or the GOSs. The data received from, or to be transmitted to, the network by the NIC may be copied directly between the NIC's buffer and a corresponding application buffer for one of the GOSs without copying the data to a TGOS. The NIC may access the GOS buffer via a virtual address, a buffer offset, or a physical address. The virtual address and the buffer offset may be translated to a physical address.

42 Claims, 12 Drawing Sheets

| V-Tag 476 | Physical Address 477 |
|---|---|
| VT1 | PA1 |
| VT2 | PA2 |
|  |  |
| VTm | PAm |
| VTn | PAn |

METHOD AND SYSTEM FOR ZERO COPY IN A VIRTUALIZED NETWORK ENVIRONMENT

CROSS-REFERENCE TO RELATED APPLICATIONS/INCORPORATION BY REFERENCE

This application makes reference to, claims priority to, and claims benefit of U.S. Provisional Application Ser. No. 60/758,581 filed Jan. 12, 2006.

This application also makes reference to U.S. patent application Ser. No. 11/623,011 filed Jan. 12, 2007.

FEDERALLY SPONSORED RESEARCH OR DEVELOPMENT

[Not applicable]

MICROFICHE/COPYRIGHT REFERENCE

[Not applicable]

FIELD OF THE INVENTION

Certain embodiments of the invention relate to network interfaces. More specifically, certain embodiments of the invention relate to a method and system for zero copy in a virtualized network environment.

BACKGROUND OF THE INVENTION

In networking systems, a single machine, for example, a server or a client, may be utilized to concurrently support multiple server operations or services. For example, a single server may be utilized for providing access to business applications while also operating as an email server, a database server, and/or an exchange server. The server may generally support the various server operations by utilizing a single operating system (OS). The server operations, via the single OS, make use of server processing resources such as the central processing unit (CPU), memory, network interface card (NIC), peripheral sound card, and/or graphics card, for example. In many instances, the server resources may not be efficiently utilized because the demand for server operations generally vary based on the type of service provided and/or user needs. Consolidating server services into a single physical machine may result in an improvement in server efficiency. However, consolidation also removes the level of protection that is provided when the operations are maintained separately. For example, when the operations are consolidated, a crash or failure in a database server may also result in the loss of email services, exchange services, and/or application services.

Another approach for improving server efficiency may be to utilize multiple operating systems running concurrently so that each operating system supports a different server operation or application or service, for example. The multiple operating systems may be referred to as guest operating systems (GOSs) or child partitions. This approach maintains the level of protection provided when server operations are not consolidated under a single operating system while also enabling the optimization of the usage of the processing resources available to the server. The use of multiple guest operating systems may be referred to as OS virtualization because each GOS perceives to have full access to the server's hardware resources. In this regard, a GOS is unaware of the presence of any other GOS running on the server. In order to implement OS virtualization, a software layer may be needed to arbitrate access to the server's hardware resources. This software layer may be referred to as a hypervisor or virtual machine (VM) monitor, for example. The hypervisor may enable the multiple GOSs to access the hardware resources in a time-sharing manner. This software layer may be assisted by a trusted GOS (TGOS), which may also be referred to as a parent partition, or Virtual Machine Kernel (VMK) for instance.

The NIC may be a hardware resource that is frequently utilized by at least one of the server operations or services. In this regard, a hypervisor or VM monitor may enable creating a software representation of NIC that may be utilized by a GOS. This software representation of the NIC may be referred to as a "virtual NIC." However, a virtual NIC may not be able to offer a full set of features or functionalities of the hardware NIC to a GOS. For example, a virtual NIC may only be able to provide basic layer 2 (L2) networking functionality to a GOS. The virtual NIC may be limited to providing data communication between a GOS and the network through another SW entity, such as a TGOS or VMK. In this regard, the virtual NIC may not be able to support other advanced features such as remote direct memory access (RDMA) and/or Internet small computers system interface (iSCSI), directly to the GOS for example. Additionally, data may be copied among a plurality of buffers prior to transmission to a network by the NIC or after reception from a network by the NIC. The copying of data may be an overhead to, for example, a host processor.

Further limitations and disadvantages of conventional and traditional approaches will become apparent to one of skill in the art, through comparison of such systems with some aspects of the present invention as set forth in the remainder of the present application with reference to the drawings.

BRIEF SUMMARY OF THE INVENTION

A system and/or method for zero copy In a virtualized network environment, substantially as shown in and/or described in connection with at least one of the figures, as set forth more completely in the claims.

Various advantages, aspects and novel features of the present invention, as well as details of an illustrated embodiment thereof, will be more fully understood from the following description and drawings.

BRIEF DESCRIPTION OF SEVERAL VIEWS OF THE DRAWINGS

FIG. 4A is an exemplary diagram of an address translation table, in accordance with an embodiment of the invention.

DETAILED DESCRIPTION OF THE INVENTION

Certain embodiments of the invention may be found in a method and system for zero copy in a virtualized network environment. Aspects of the method may comprise a plurality of GOSs that share a single network interface circuitry or a network interface card, either of which may be referred to as a NIC. A direct channel may be established between at least one of the plurality of GOSs and the single network interface circuitry, wherein the network interface circuitry may copy data directly between its buffer and a corresponding application buffer for one of the plurality of GOSs. The GOSs may access a network via the NIC when the NIC switches communication to that GOS. The NIC may also offload network operations from a host system and/or from the GOSs. The network operations may comprise, for example, OSI layer 3, 4, and/or 5 protocol operations. The network operations may also comprise TCP operations and/or IP operations. The NIC may also execute link layer network protocol operations, which may be OSI layer 2 protocol operations.

In allowing network access to a GOS, the NIC may copy data directly between its buffer and a corresponding buffer or an application buffer for one of the GOSs. The data may be data received from the network by the NIC, or data to be transmitted to the network by the NIC. The data may be copied without copying the data to a trusted GOS (TGOS). The NIC may access the buffers for the GOSs via a virtual address, which may be translated to a physical address, communicated by the GOSs to the NIC. The address translation may be achieved via an address translation table or an I/O memory management unit. Alternatively, a GOS may communicate a buffer offset index to the NIC. An address translation table may be used to translate the buffer offset index to an address that may be used to access the buffer data. In certain instances, a GOS may communicate a physical address for a buffer to the NIC.

Various architectures may refer to, for example, a GOS, TGOS, and hypervisor. Other architectures may refer to, for example, child partition, parent partition, and a hypervisor, or VM, VMK, and VMM. Still other architectures may refer to, for example, DomU, Dom0, and a hypervisor. It should be understood that a specific architecture is not a limiting factor with respect to this invention.

Figure 1A:
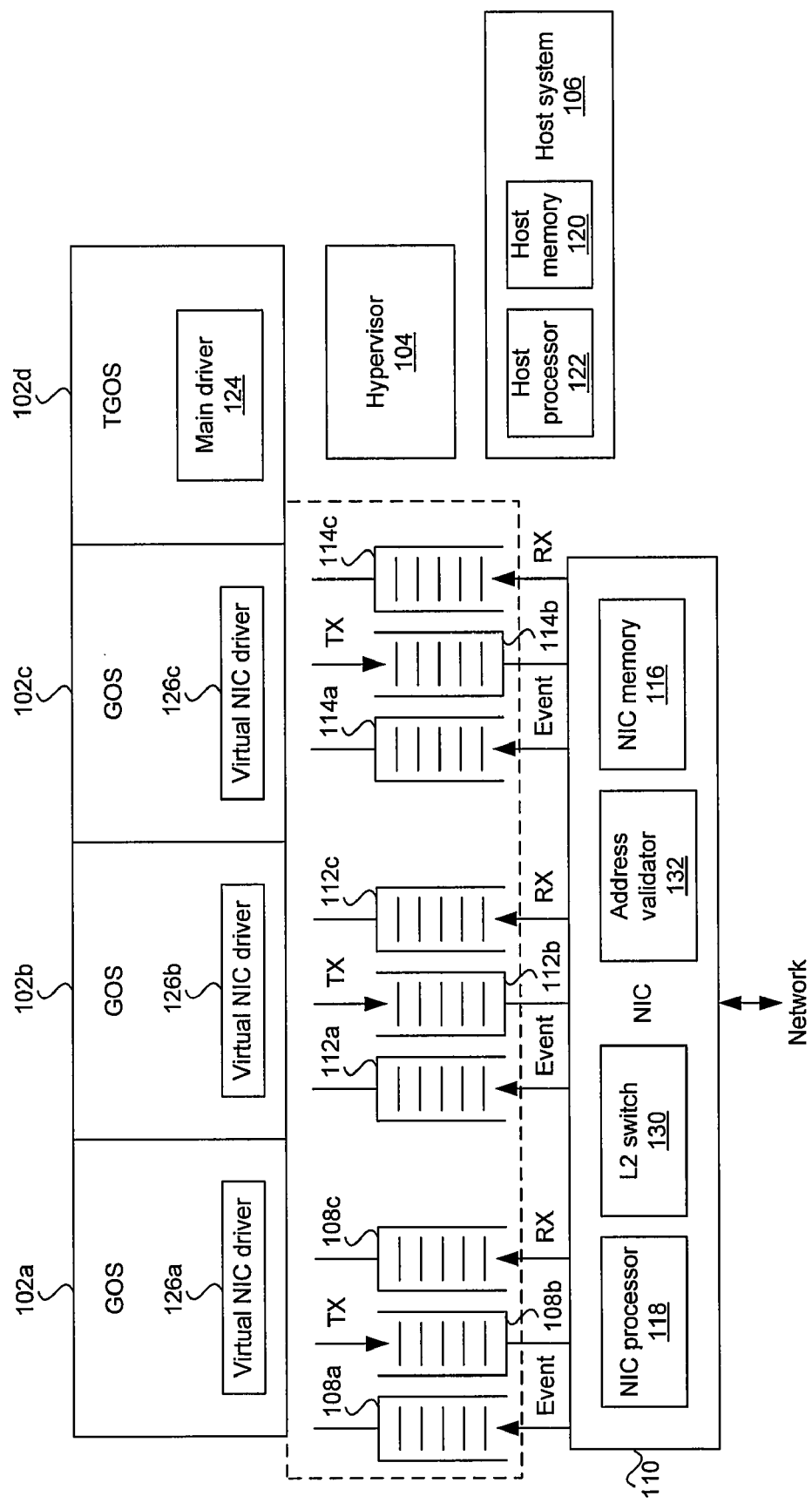
FIG. 1A is a block diagram of an exemplary NIC that supports level 2 (L2) switching and/or higher layer of switching for communication between GOSs in a host system, which may be utilized in connection with an embodiment of the invention.

FIG. 1A is a block diagram of an exemplary NIC that supports level 2 (L2) switching and/or higher layer of switching for communication between GOSs in a host system, which may be utilized in connection with an embodiment of the invention. The switching supported by the NIC need not be limited to L2 only, it can be any combination of L2, VLAN, L3, L4, higher protocol layer and/or additional information including from the administrator as to how to perform the switching. Referring to FIG. 1A, there is shown GOSs 102a, 102b, and 102c, a TGOS 102d, a hypervisor 104, a host system 106, event queues 108a, 112a, and 114a, transmit (TX) queues 108b, 112b, and 114b, receive (RX) queues 108c, 112c, and 114c, and a NIC 110. The TGOS 102d may comprise a main driver 124. The host system 106 may comprise a host processor 122 and a host memory 120. The NIC 110 may comprise a NIC processor 118, a NIC memory 116, a L2 switch 130, and a physical address validator 132.

The host system 106 may comprise suitable logic, circuitry, and/or code that may enable data processing and/or networking operations, for example. In some instances, the host system 106 may also comprise other hardware resources such as a graphics card and/or a peripheral sound card, for example. The host system 106 may support the operation of the GOSs 102a, 102b, and 102c via the hypervisor 104. The GOSs 102a, 102b, and 102c may each correspond to an operating system that may enable the running or execution of operations or services such as applications, email server operations, database server operations, and/or exchange server operations, for example. The number of GOSs that may be supported by the host system 106 by utilizing the hypervisor 104 need not be limited to any specific number. For example, one or more GOSs may be supported by the host system 106. Internal switching may occur between GOSs or between a GOS and the TGOS.

The hypervisor 104 and/or the TGOS 102d may operate as a software layer that may enable OS virtualization of hardware resources in the host system 106 and/or virtualization of hardware resources communicatively connected to the host system 106, such as the NIC 110, for example. The hypervisor 104 and/or the TGOS 102d may allocate hardware resources and also may enable data communication between the GOSs and hardware resources in the host system 106 and/or hardware resources communicatively connected to the host system 106. For example, the hypervisor 104 may enable communication between the GOSs supported by the host system 106 and the NIC 110 via the event queues 108a, 112a, and 114a, the TX queues 108b, 112b, and 114b, and/or the RX queues 108c, 112c, and 114c. In this regard, communication between the first GOS 102a and the NIC 110 may occur via the event queue 108a, the TX queue 108b, and the RX queue 108c. Similarly, communication between the second GOS 102b and the NIC 110 may occur via the event queue 112a, the TX queue 112b, and the RX queue 112c. Communication between the third GOS 102c and the NIC 110 may occur via the event queue 114a, the TX queue 114b, and the RX queue 114c. In this regard, each set of queues may operate separately and independently from the others. In this sense when a relevant GOS is engaged in network transmission or reception, data may travel directly to/from the NIC after the TGOS 102d has allocated the queues, internal resources required on the NIC, consulted with the configuration and administrative information.

The TGOS 102d may comprise a main driver 124 that may coordinate the transfer of data between the GOSs and the queues. The main driver 124 may communicate with the virtual NIC driver 126a in the GOS 102a, the virtual NIC driver 126b in the GOS 102b, and/or the virtual NIC driver 126c in the GOS 102c. Each virtual NIC driver may correspond to a portion of a GOS that may enable transfer of data between the operations or services performed by the GOSs and the appropriate queues via the main driver 124. For example, packets and/or descriptors of packets for transmission from an operation or service in the first GOS 102a may be transferred to the TX queue 108b by the Virtual NIC driver 126a. In another example, data posted to the event queue 108a to indicate a network condition or to report data transmission or data reception by the NIC 110, may be transferred to a buffer posted by the virtual NIC driver 126a. In another example, packets received by the NIC 110 from the network that have a MAC address or other address or attribute that may correspond to the first GOS 102a may be transferred from the RX queue 108c to a buffer posted by the virtual NIC driver 126a.

The host processor 122 may comprise suitable logic, circuitry, and/or code that may enable control and/or management of the data processing and/or networking operations associated with the host system 106. The host memory 120 may comprise suitable logic, circuitry, and/or code that may enable storage of data utilized by the host system 106. The host memory 120 may be partitioned into a plurality of memory portions. For example, each GOS supported by the host system 106 may have a corresponding memory portion in the host memory 120. Moreover, the hypervisor 104 may have a corresponding memory portion in the host memory 120. In this regard, the hypervisor 104 and/or the TGOS 102d may enable data communication between GOSs by controlling the transfer of data from a portion of the memory 120 that corresponds to one GOS to another portion of the memory 120 that corresponds to another GOS.

The NIC 110 may comprise suitable logic, circuitry, and/or code that may enable communication of data with a network. The NIC 110 may enable basic L2 switching, VLAN based switching, TCP offload, iSCSI, and/or RDMA operations, for example. The NIC 110 may be referred to an OS virtualization-aware NIC because communication with each GOS occurs by an independent set of queues. The NIC 110 may determine the right address or combination of address information, such as, for example, VLAN address, L3 address, L4 address, L4 port, among others, to be used in order to select the right target GOS. For instance, the NIC 110 may determine the MAC address of received packets and may transfer the received packets to the RX queue that corresponds to the GOS with the appropriate MAC address. Similarly, the NIC 110 may enable transfer of packets from the GOSs to the network by coordinating and/or arbitrating the order in which packets posted for transmission in the TX queues may be transmitted. In this regard, the NIC 110 is said to enable direct input/output (I/O) or hypervisor bypass operations.

Some embodiments of the invention may comprise the NIC 110 that may allow validation, correction, and/or generation of, for example, MAC addresses or VLAN tags or IP addresses or attributes like TOS bits. For example, the NIC 110 may detect that a GOS may request a packet to be sent with a wrong source MAC address. The NIC 110 may validate a source MAC address by, for example, comparing the source MAC address for a packet with MAC addresses that may be associated with specific GOS or buffers, and/or packet types.

The NIC 110 may flag the wrong source MAC address as an error to the TGOS and/or to the GOS, and may discard the packet. Another embodiment of the invention may enable the NIC 110 to overwrite the incorrect parameter or attribute, for example, the source MAC address for the packet from a GOS with a correct source MAC address, and proceed with transmitting the packet. Similarly, another embodiment of the invention may generate an appropriate source MAC address for each packet from the GOSs without validating the source MAC address. Accordingly, an application program running on a GOS may not need to generate a source MAC address as the NIC 110 may write the source MAC address. The NIC 110 may also monitor use of bandwidth and/or priority per GOS. The NIC 110 may, for example, allocate bandwidth limits or frames per GOS, and/or ensure that GOS or applications or flows associated with a GOS do not claim priority different than that assigned by the administrator and/or TGOS.

The event queues 108a, 112a, and 114a may comprise suitable logic, circuitry, and/or code that may enable posting of data by the NIC 110 to indicate the occurrence of an event. For example, the NIC 110 may post data in the event queues to indicate that the link is down or that the link is up. The current status of the link, whether it is up or down, may be posted to all the event queues, for example.

The TX queues 108b, 112b, and 114b may comprise suitable logic, circuitry, and/or code that may enable posting of data for transmission via the NIC 110 from the GOSs 102a, 102b, and 102c respectively. The RX queues 108c, 112c, and 114c may comprise suitable logic, circuitry, and/or code that may enable posting of data received via the NIC 110 for processing by the GOSs 102a, 102b, and 102c respectively. The TX queues 108b, 112b, and 114b and/or the RX queues 108c, 112c, and 114c may be integrated into the NIC 110, for example. The queues may reside in host memory 120, in the NIC 110 or in a combination of host memory 120 and NIC 110.

The NIC processor 118 may comprise suitable logic, circuitry, and/or code that may enable control and/or management of the data processing and/or networking operations in the NIC 110. The NIC memory 116 may comprise suitable logic, circuitry, and/or code that may enable storage of data utilized by the NIC 110. The NIC 110 may be shared by a plurality of GOSs 102a, 102b, and 102c. In some embodiments of the invention, network protocol operations may be offloaded to the NIC 110 and handled by the NIC 110. The offloaded network protocol operations may comprise OSI layer 3, 4, and/or 5 protocol operations, such as, for example, TCP and/or IP operations. The NIC may also execute link layer network protocol operations, which may be, for example, OSI layer 2 protocol operations, for example, a VLAN.

Accordingly, the NIC 110 may be a shared resource for the plurality of GOSs. The operations of the GOSs and the NIC may be coordinated by a TGOS and a hypervisor. Operation of a GOS and a NIC may comprise copying data between a GOS and the NIC. This may be accomplished by the NIC when the GOS communicates to the NIC an address of a buffer or a reference to an address of a buffer to be accessed in that GOS. The address may be a physical address or a virtual address. A virtual address may be translated to a physical address via, for example, an address translation table or a memory management unit. The means of address translation may be design and/or implementation dependent.

The L2 switch 130 may comprise suitable logic, circuitry, and/or code that may enable the NIC 110 to support packet communication between a GOS and the network and/or between GOSs, for example. Placing switching functionality in the NIC 110 may, for example, reduce end-to-end latency when transmitting or receiving packets. The L2 switch 130 may support unicast, broadcast, and/or multicast operations. Unicast operations may refer to packet transmissions to a single MAC address. Broadcast operations may refer to packet transmissions to all MAC addresses. Multicast operations may refer to packet transmission to a particular group of MAC addresses.

For example, the GOS 102a may send a packet to at least one device communicatively coupled to the network. In this instance, the virtual NIC driver 126a may transfer the packet to the TX queue 108b corresponding to the GOS 102a. The L2 switch 130 may receive the packet from the TX queue 108b and may determine that the destination MAC address or addresses correspond to a device or devices on the network. The NIC 110 may then communicate the packet to the network.

In another example, the GOS 102a may have a data packet to transmit to the GOS 102b and/or the GOS 102c. In this instance, the virtual NIC driver 126a may place the data packet on the TX queue 108b corresponding to the GOS 102a. The L2 switch 130 may receive the data packet from the TX queue 108b and may determine that the destination MAC address may correspond to the GOS 102b. The NIC 110 may place, for example, the data packet in to the RX queue 112c corresponding to the GOS 102b. The virtual NIC driver 126b may be notified of the data packet in the RX queue 112c via the event queue 112a, and the virtual NIC driver 126b may copy the data packet for use by an application program on the GOS 102b.

The NIC 110 may also comprise the physical address validator 132. The physical address validator 132 may comprise suitable logic, circuitry, and/or code that may enable the validation of the address of a buffer posted by a virtual NIC driver to store a received packet. For example, before a packet in a RX queue is transferred to a posted buffer, the physical address validator 132 may validate that the posted buffer is in an address or memory location that corresponds to the GOS associated with the received packet. When the address is validated, the received packet may be transferred from the RX queue to the posted buffer. If the physical address cannot be validated, the NIC 110 may notify, for example, the TGOS and/or the hypervisor and/or the main driver 124 and/or virtual NIC driver 126a. Accordingly, the virtual NIC driver 126a may post a new buffer to receive the packet from the RX queue or another action such as bringing down the virtual drive may be taken by the TGOS and/or hypervisor. Similar validation for transmit buffer addresses can be performed by the NIC. Various embodiments of the invention utilizing the GOS and the hypervisor may be described with respect to FIGS. 2A, 2B, 2C, 3A, 3B, 3C, 4A, 4B, and 4C.

Figure 1B:
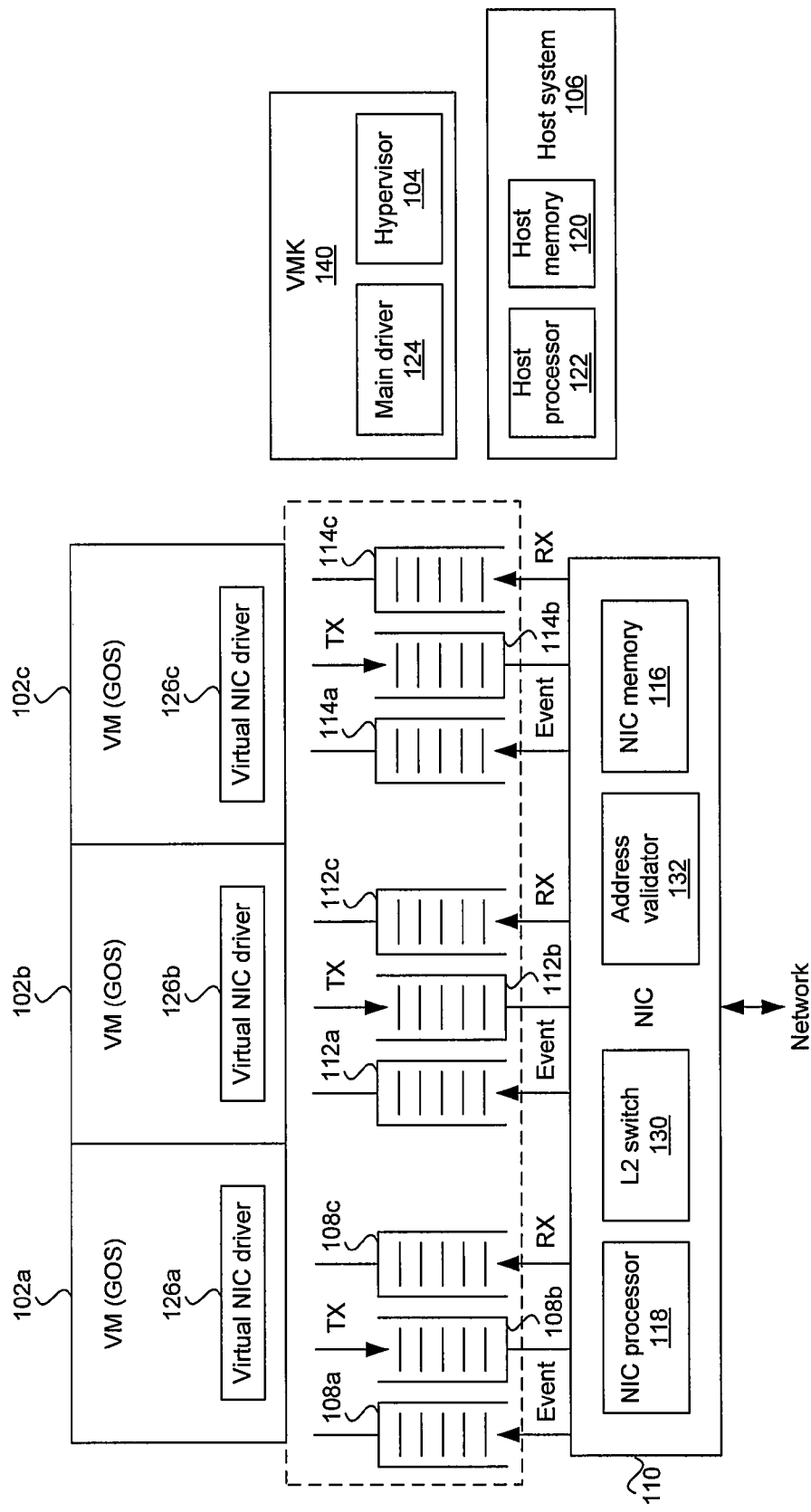
FIG. 1B is a block diagram of an exemplary NIC that supports level 2 (L2) switching and/or higher layer of switching for communication between GOSs in a host system, which may be utilized in connection with an embodiment of the invention.

FIG. 1B is a block diagram of an exemplary NIC that supports level 2 (L2) switching and/or higher layer of switching for communication between VMs, in a host system, which may be utilized in connection with an embodiment of the invention. FIG. 1B may be similar to the FIG. 1A in many respects. For example, a VM may comprise similar functionality as a GOS. However, the FIG. 1B may not have the TGOS 102d. The FIG. 1B may comprise, however, a VM kernel (VMK) 140, which may comprise the main driver 124 and the hypervisor 104. Accordingly, the functionality of the VMK 140 in FIG. 1B may be similar to the functionality of the TGOS 102d and/or the hypervisor 104 in FIG. 1A.

Figure 1C:
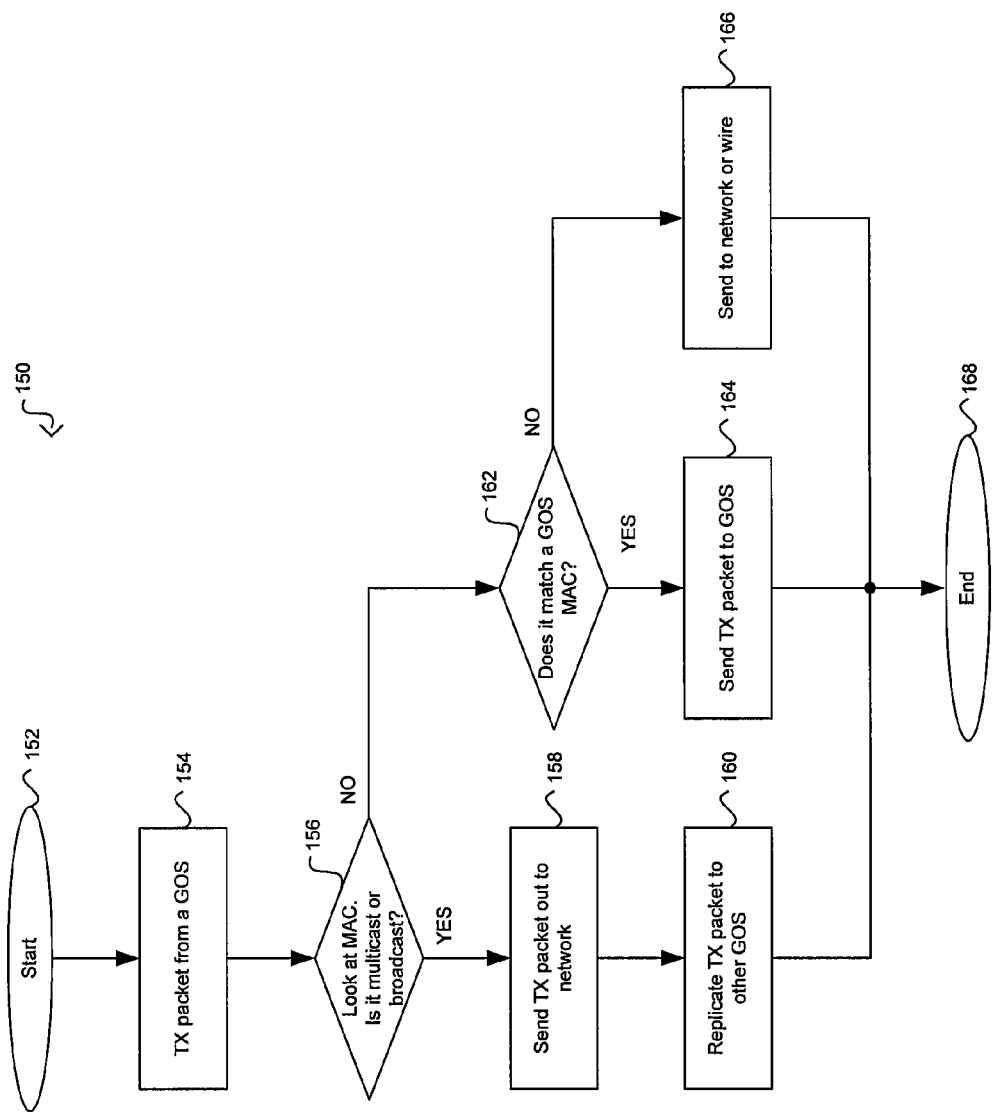
FIG. 1C is a flow diagram illustrating exemplary steps for transmitting to a network via a NIC, which may be utilized in connection with an embodiment of the invention.

FIG. 1C is a flow diagram illustrating exemplary steps for transmitting to a network via a NIC, which may be utilized in connection with an embodiment of the invention. Referring to FIG. 1C, there is shown a flow diagram 150. After start step 152, in step 154, a packet may be generated for transmission by a GOS supported by the host system 106 in FIG. 1A. The Virtual NIC driver may transfer the packet to the appropriate TX queue. The L2 switch 130 in FIG. 1A may receive the packet from the TX queue and may determine the destination MAC address or addresses. In step 156, based on the MAC address or addresses corresponding to the destination of the packet, the L2 switch 130 may determine whether the packet transmission is to be a unicast, a broadcast, or a multicast. When the packet transmission is a multicast or a broadcast, the process of the flow diagram 150 may proceed to step 158.

In step 158, the L2 switch 130 may transfer the packet to the appropriate MAC addresses on the network that are listed as part of the multicast or broadcast transmission. In step 160, the L2 switch 130 may also transfer the packet to the RX queue of each GOS with a MAC address listed as part of the multicast or broadcast transmission. The virtual NIC driver for each of the GOSs listed may be notified of the received packet and may copy the received packet to a posted buffer in the appropriate portion of the host memory 120. The operation or service executing on each of the GOSs listed may read the received packet from the posted buffer, for example. After step 160, the process of the flow diagram 150 may proceed to end step 168.

Returning to step 156, when the packet is to be a unicast address, the process of the flow diagram 150 may proceed to step 162. In step 162, the L2 switch 130 may determine whether the MAC address corresponds to a GOS supported by the host system 106 or to a device on the wire or network. When the MAC address of the packet to be transmitted corresponds to a GOS, the process of the flow diagram 150 may proceed to step 164. In step 164, the L2 switch 130 may transfer the packet to the RX queue that corresponds to the GOS with the appropriate MAC address. The Virtual NIC driver may be notified of the received packet and may post a buffer in the appropriate portion of the host memory 120. The operation or service executing on the GOS may read the received packet from the posted buffer, for example. After step 164, the process of the flow diagram 150 may proceed to end step 168.

Returning to step 162, when the MAC address of the packet to be transmitted corresponds to a device on the network, the process of the flow diagram 150 may proceed to step 166. In step 166, the L2 switch 130 with the NIC 110 assistance may transfer the packet to the appropriate MAC address on the network. After step 166, the process of the flow diagram 150 may proceed to end step 168.

The OS virtualization-aware NIC described herein may enable OS virtualization that reduces the overhead requirements of the hypervisor layer for communication of packets between a GOS and the network and/or between GOSs. The OS virtualization-aware NIC may support a plurality of GOSs. Moreover, the OS virtualization-aware NIC may enable the virtualization of advanced features such as TCP offload functions, RDMA, and/or iSCSI interfaces, for example. Embodiments of the invention that enable reduction of latency for work requests may be described with respect to following figures. A work request, which may be placed on one of the TX queues as a WQE, for example, may be generated by a GOS in order to transfer data from an application program buffer directly to the NIC 110 and from there to a network.

Figure 2A:
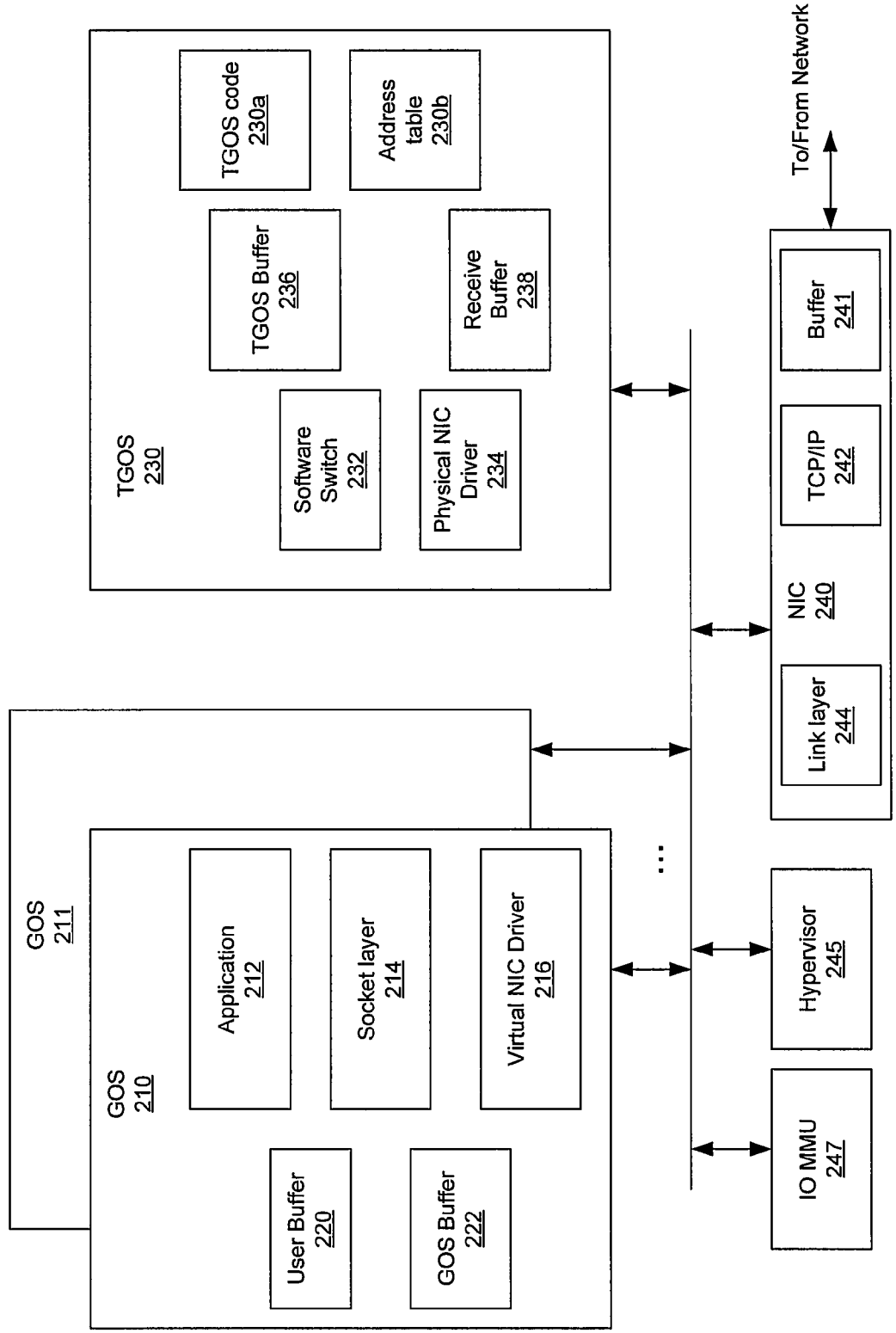
FIG. 2A is a block diagram illustrating exemplary GOS protocol offload functionality by the NIC with I/O sharing, using the TGOS as an intermediary between the GOS and the NIC in accordance with an embodiment of the invention.

FIG. 2A is a block diagram illustrating exemplary protocol offload functionality with I/O sharing, in accordance with an embodiment of the invention. Referring to FIG. 2A, there is shown a GOS 210, a TGOS 230, a NIC 240, a hypervisor 245, and an I/O memory management unit (I/O MMU) 247. The GOS 210 may comprise an application layer 212, a socket layer 214, and a virtual NIC driver 216. A user buffer 220 and a GOS buffer 222 may be allocated, for example, by the GOS 210, the TGOS 230, and/or the hypervisor 245, for use by the GOS 210. Accordingly, the user buffer 220 and the GOS buffer 222 may be a logical part of the GOS 210. The GOS 210 may be similar to the GOS 102a, 102b, or 102c described with respect to FIG. 1A. A plurality of GOSs may share a common resource, for example, the NIC 240.

The application layer 212 may comprise, for example, an application program for email service or a web-browsing program. The socket layer 214 may comprise suitable code that may enable transfer of data from the application layer 212 to lower layers, such as, for example, TCP/IP layers, and vice versa. The virtual NIC driver 216 may comprise suitable code that may allow transfer of data from the GOS 210 to the NIC 240 and vice versa. The user buffer 220 and the GOS buffer 222, which may be used by the GOS 210, may be a part of the host memory 120, for example.

The TGOS 230 may comprise suitable logic, circuitry, and/or code that may enable support of a plurality of GOSs that transmit and/or receive data from the network. The TGOS 230 may comprise a software switch 232, a physical NIC driver 234, TGOS code 230a, and an address table 230b. A TGOS buffer 236 and a receive buffer 238 may be allocated, for example, by the TGOS 230 and/or the hypervisor 245, for use by the TGOS 230. Accordingly, the TGOS buffer 236 and the receive buffer 238 may be a logical part of the TGOS 210.

The software switch 232, which may be similar to the L2 switch 130, may comprise suitable code that may allow routing of data from one of a plurality of GOSs to the NIC 240, and vice versa. Accordingly, the NIC 240 may be shared by various GOSs. The physical NIC driver 234 may comprise suitable code that may allow data to be transferred to and/or from the NIC 240.

The TGOS buffer 236 may be used to store data from the GOS 210 and/or data from the NIC 240. The TGOS buffer 236 may be part of the host memory 120, for example. The receive buffer 238 may be used to hold data from the NIC 240. The receive buffer 238 may be, for example, a part of the host memory 120 or the receive buffer 238 may be a hardware buffer.

The TGOS code 230a may, for example, enable allocation of buffers for use by the GOSs. The address table 230b may enable translation of an offset index or a virtual address for a buffer to a physical address for the buffer. The address translation table 230b may comprise addresses for a pool of buffers, where the buffers may be part of the host memory 120, for example. In other embodiments of the invention, the address translation table may not be available to a GOS, but may be available to the TGOS 230, for example, as well as to the hypervisor 245 and the I/O MMU 247 or to the hypervisor and the I/O MMU only. While an address translation table may have been described for address translation, the invention need not be so limited. A specific means of address translation may be design and/or implementation dependent.

The NIC 240 may comprise suitable logic, circuitry, and/or code that may process data from an application layer for transmission to a network, or receive data from the network to an application layer. The NIC 240 may also comprise a NIC buffer 241, L5 for the RDMA or ISCSI or other session layer and/or higher layer code, a hardware resident TCP/IP layer block 242, and a link layer block 244. The NIC buffer 241 may be used to store data that may be received from the network and/or data that may be transmitted to the network. The NIC buffer 241 may be similar, for example, to the TX queues 108b, 112b, and 114b, and the RX queues 108c, 112c, and 114c. The TCP/IP layer block 242 may comprise suitable logic, circuitry, and/or code that may be utilized to process data transmitted and/or received from the network with respect to TCP/IP protocols. The link layer block 244 may comprise suitable logic, circuitry, and/or code that may be utilized, for example, for processing data for Ethernet link layer protocol before being transmitted and/or after being received from the network.

The hypervisor 245 may comprise suitable logic, circuitry, and/or code that may enable coordinating control of data being received and transmitted from the network, and for allocation of resources. Some embodiments of the invention may comprise the hypervisor 245 in coordination with a TGOS, for example. Resources allocated may comprise, for example, various buffers for the plurality of GOSs and TGOS, and the NIC 240. For example, the buffers may be allocated at power up from the host memory 120 and/or dynamically from the host memory 120 while the GOS 210, the TGOS 230, and/or the hypervisor 245 may be operating. The hypervisor 245 may receive requests for buffers from the GOS via, for example, the socket layer 214 and may route the received requests to the TGOS 230. The TGOS 230 may then allocate a buffer. The TGOS 230 may send address or a reference to the address of the allocated buffer to the hypervisor 245. The hypervisor 245 may then communicate the address of the allocated buffer to the socket layer 214. In order to isolate memory resources allocated to one GOS from another GOS, the memory communicated to the GOS may be a virtual address or an address referred to as bus address or DMA address or device address that may need to be translated to a physical memory address. Alternatively, the TGOS 230 may send an offset index to the buffer, and the offset index may be communicated to the socket layer 214.

The I/O MMU 247 may comprise suitable logic, circuitry, and/or code that may enable translation of virtual address or an address referred to as bus address or DMA address or device address to a physical address when set up to translate for specific virtual address ranges. Accordingly, a device, for example, the NIC 240 may attempt to address a memory location with a virtual memory address or an address referred to as bus address or DMA address or device address. For simplicity the rest of the text refers to these addresses as a virtual address, although these addresses may differ from the virtual address used by the GOS. The virtual memory address may be intercepted by the I/O MMU 247, and the I/O MMU 247 may translate the virtual memory address to a physical memory address. The I/O MMU 247 may output the physical memory address to, for example, an address bus coupled with the host system memory. In turn the memory may produce the content for a read operation or store it for a write operation. Accordingly, for a read operation the NIC 240 may then read the data at the location of the physical memory address. Alternatively, the NIC 240 may request that the I/O MMU 247 send the translated physical address to the NIC 240. The NIC 240 may then access the physical address location directly by using the physical address from the I/O MMU 247.

In operation, the application layer 212 in the GOS 210 may have data to be transmitted to the network. The data may be, for example, in the user buffer 220. The data may be copied from the user buffer 220 to the GOS buffer 222 by, for example, the socket layer 214. The socket layer 214 may request a buffer from, for example, its OS for use as the GOS buffer 222 if there is not a buffer available for use as the GOS buffer 222. If the OS is resource limited and virtualization aware, the OS may request support from the TGOS. Mapping and pinning of buffers by a TGOS in some embodiments of the invention is described with respect to FIG. 4B. The socket layer 214 may indicate to the virtual NIC driver 216 the address of the GOS buffer 222.

In one embodiment of the invention, the GOS may communicate to the NIC via the TGOS. The virtual NIC driver 216 may provide an interface for transferring the data in the GOS buffer 222 to the TGOS 230 via the hypervisor 245. This may include, for example, the address of the GOS buffer 222. Accordingly, the hypervisor 245 may copy the data in the GOS buffer 222 to the TGOS buffer 236 that may correspond to the GOS 210. The data may include, for example, reference to a particular network connection. The hypervisor 245 may then invoke the TGOS 230. The software switch 232 may post information about the data in the TGOS buffer 236 to, for example, the physical NIC driver 234. The information may comprise, for example, an address of the TGOS buffer 236 and/or which network connection the data may correspond to. The network connection information along with the GOS identity may allow the NIC 240 to process the data appropriately when several applications may each have one or more open network connection.

The physical NIC driver 234 may communicate this information to the NIC 240. If the address for the TGOS buffer 236 is a physical address, the NIC 240 may use the physical address to transfer data from the TGOS buffer 236 to, for example, to the NIC buffer 241. The data transfer may occur via, for example, a programmed I/O or DMA transfer to the NIC buffer 241. If the buffer address is not a physical address the NIC 240 may, for example, search the address translation table 230*b* to find a corresponding physical address.

The TCP/IP layer block 242 in the NIC 240 may segment the data from the TGOS 230 to a plurality of packets, and encapsulate the segmented data to be transmitted with appropriate TCP/IP information. The encapsulated data from the TCP/IP layer block 242 may then be encapsulated with appropriate link layer information by the link layer block 244. The packet from the link layer block 244 may be transmitted on to the network by the NIC 240.

Additionally, the NIC 240 may receive a packet from the network. The received data may be processed and stored, for example, in the NIC buffer 241. The link layer block 244 may parse the link layer information from the received packet. If the link layer block 244 determines that the packet reached the correct NIC, the link layer information may be removed. Otherwise, the link layer block 244 may discard the received packet. The link layer block 244 may parse information in the Ethernet header in order to determine whether a plurality of Ethernet packets may be reassembled to form an IP packet. The link layer block 244 may receive and reassemble a plurality of the Ethernet packets to form one IP packet, which may be communicated to the TCP/IP layer block 242.

The TCP/IP layer block 242 may determine if a plurality of IP packets may be reassembled to form a TCP packet. If so, the TCP/IP layer block 242 may receive and reassemble a plurality of the IP packets to form one TCP packet. The resulting TCP packet may be processed by the TCP/IP layer block 242 to form a data packet. The processing may comprise removing a TCP header. The NIC 240 may also determine which particular GOS should be the recipient of the received data, by using the address information in the packet to assist in relating incoming frames to a particular GOS. The particular GOS may be notified of the received data by the NIC 240 when the NIC 240 places an event in, for example, the event queue 108*a*, 112*a*, or 114*a*.

The physical NIC driver 234 may communicate with the NIC 240 to control the transfer of the data in, for example, the NIC buffer 241 to the receive buffer 238. For example, the physical NIC driver 234 may communicate address of the receive buffer 238. If the address for the receive buffer 238 is a physical address, the NIC 240 may use the physical address to transfer data from the NIC buffer 241 to the receive buffer 238. Otherwise, the NIC 240 may translate the buffer address from the physical NIC driver 234 to a physical address via, for example, the services of the I/O MMU or the address translation table 230*b*. The data transfer by the NIC 240 may be achieved via, for example, a programmed I/O or DMA transfer.

The software switch 232 may copy the data in the receive buffer 238 to the TGOS buffer 236, which may be, for example, a corresponding TGOS buffer for the GOS 210. The data in the TGOS buffer 236 may be copied to the GOS buffer 222 by the hypervisor 245. The hypervisor 245 may invoke a context switch to the GOS 210. The socket layer 214 may then copy the data from the GOS buffer 222 to the user buffer 220 where the application layer 212 may have access to the data. For example, if the application layer 212 comprises an email program, the data in the user buffer 222 may be an email received from the network. Accordingly, the NIC 240 may be shared by a plurality of GOSs, and the network protocol operations, such as, for example, TCP/IP operations may be offloaded to the shared NIC 240. Additionally, the interface between a GOS and the NIC may be instantiated as a partially direct interface. The interface may not be restricted to being either fully direct or fully indirect through the TGOS.

A partially direct interface may be divided into a "fastpath" and a "slowpath". The "slowpath" interface may implement a request where additional trust may be required. For example, resource allocation, a privileged operation, or an operation that might impact access to the shared resource or may impact a different GOS than the requestor GOS. It may also be derived from a standard application program interface (API), but may usually involve manipulation of NIC or HW specific data structures. Accordingly, it may be advantageous for a host processor to perform these data structure manipulations rather than having the NIC to do the manipulation.

The "fastpath" may be implemented as memory pages shared directly between the GOS (client) and NIC. This interface may be used for per-transaction interactions such as sending and receiving messages, where no additional privilege may be needed after the resources have been allocated to a particular GOS, and where the GOS operations may not impact another GOS even when the GOS operation may be invalid or fail. Because these requests may typically be a binary representation of a standard API, there may be situations where multiple device implementations could support the same binary interface.

Splitting the interface between "fastpath" and "slowpath" may allow the TGOS to act as a translator of "slowpath" requests while removing itself from the "fastpath". The client application or communication stack may make requests without knowing whether the fastpath and/or the slowpath was actually being translated by the backend driver in the TGOS.

The NIC may be a bus coupled device, for example, to a PCI Express bus. The PCI Express addendum PCI IOV requires a dedicated configuration space for each entity within the NIC that is dedicated to a GOS. The invention may not be so restricted and may be used when sharing one configuration space for all GOSs and/or having a dedicated configuration space for each supported GOS. In the former model, the hypervisor and/or TGOS and/or a management/administrative utility may be involved in configuring the NIC and allocation resources per GOS. For instance, the number of addresses, such as, for example, MAC address per GOS, the number of HW queues, the number of interrupts per GOS, offloaded connections, the type of offloaded connection, action to take in case of error, statistics to collect and where to place it, could be configured through this interface.

Although an example of a TCP/IP layers was used for the protocol stack, the invention need not be so limited. For example, various embodiments of the invention may also be used for networks that use other protocol stacks, such as, for example, the Open System Interconnection (OSI) seven-layer network model. Embodiments of the invention may comprise virtualization with a plurality of GOSs and a plurality of network layers implanted in hardware. For example, the hardware implementation of the OSI layers 5, 4, 3, and/or 2 may be in the network interface card/circuitry.

Figure 2B:
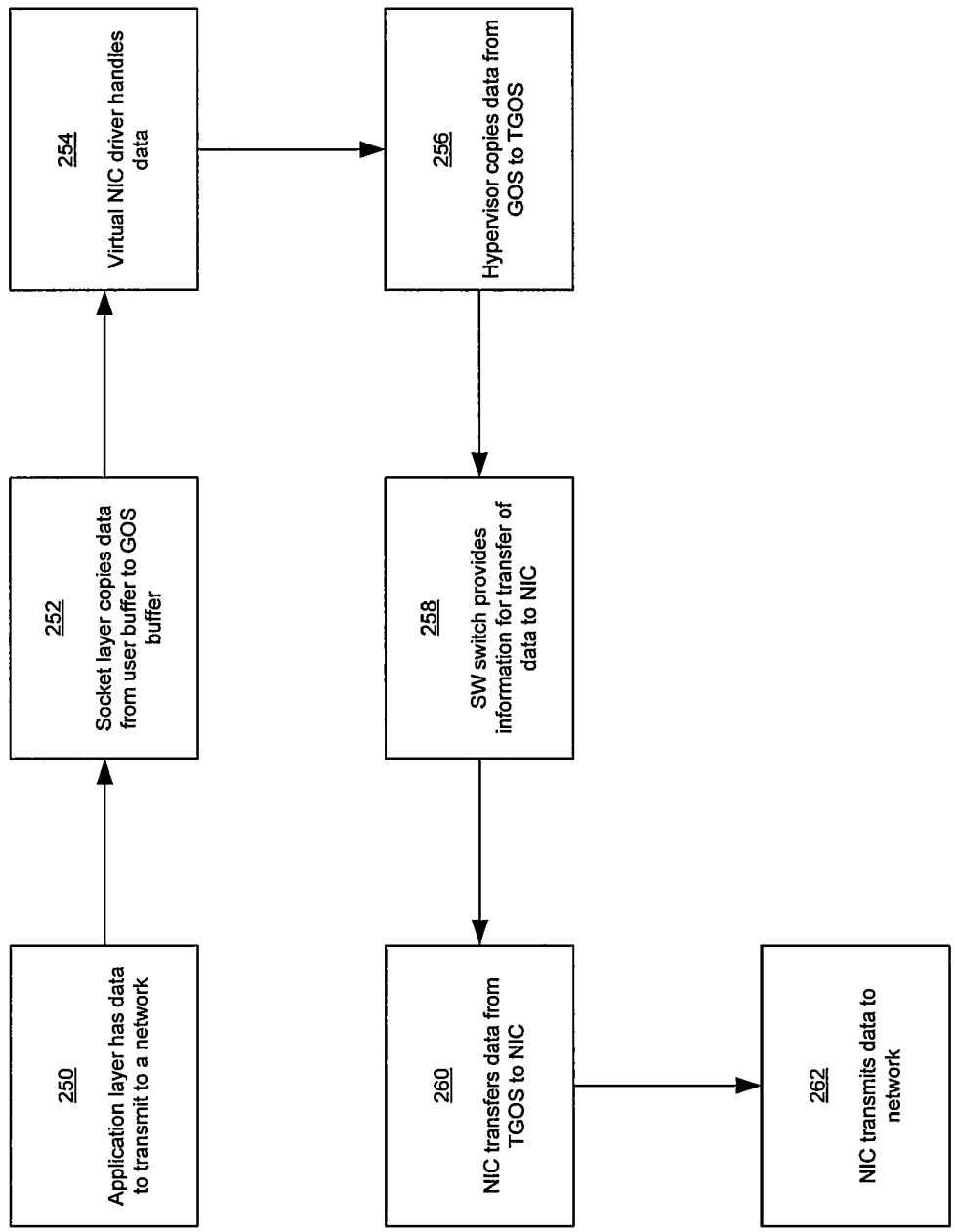
FIG. 2B is a flow diagram illustrating exemplary steps for transmitting data to a network using protocol offload functionality with I/O sharing, in accordance with an embodiment of the invention.

FIG. 2B is a flow diagram illustrating exemplary steps for transmitting data to a network using protocol offload functionality with I/O sharing, in accordance with an embodiment of the invention. Referring to FIG. 2B, there is shown steps 250 to 262. In step 250, an application layer, for example, the application layer 212 in the GOS 210, may have data to transmit to a network. The data may have been placed in the user buffer 220 by the application layer 212. For example, if the application layer 212 comprises an email program, the data in the user buffer 220 may be an email that may be sent via the network, such as, for example, the Internet.

In step 252, the data may be copied from the user buffer 220 to the GOS buffer 222 by the socket layer 214. The socket layer 214 may also indicate to the hypervisor 245 of data in the GOS buffer 222 that may be transmitted to the network. In step 254, the virtual NIC driver 216 may provide an interface for transferring the data in the GOS buffer 222 to the hypervisor 245. In step 256, the hypervisor 245 may copy the data to the TGOS buffer 236. The hypervisor 245 may also invoke a context switch to the TGOS 230.

In step 258, the data in the TGOS buffer 236 may be communicated to the NIC 240 via the software switch 232 and the physical NIC driver 234. The software switch 236 may indicate the address of the TGOS buffer 236 to the physical NIC driver 234. In step 260, the NIC 240 may process the data for transmission via the network medium, such as, for example, an Ethernet cable. For example, the TCP/IP layer block 242 in the NIC 240 may encapsulate the received data to form a TCP packet. The TCP/IP layer block 242 may then segment the TCP data to a plurality of IP packets if the TCP packet is too large. Similarly, the link layer block 244 in the NIC 240 may segment an IP packet to a plurality of Ethernet packets if the IP packet is too large. In step 262, the NIC 240 may transmit the data on to the network medium.

Figure 2C:
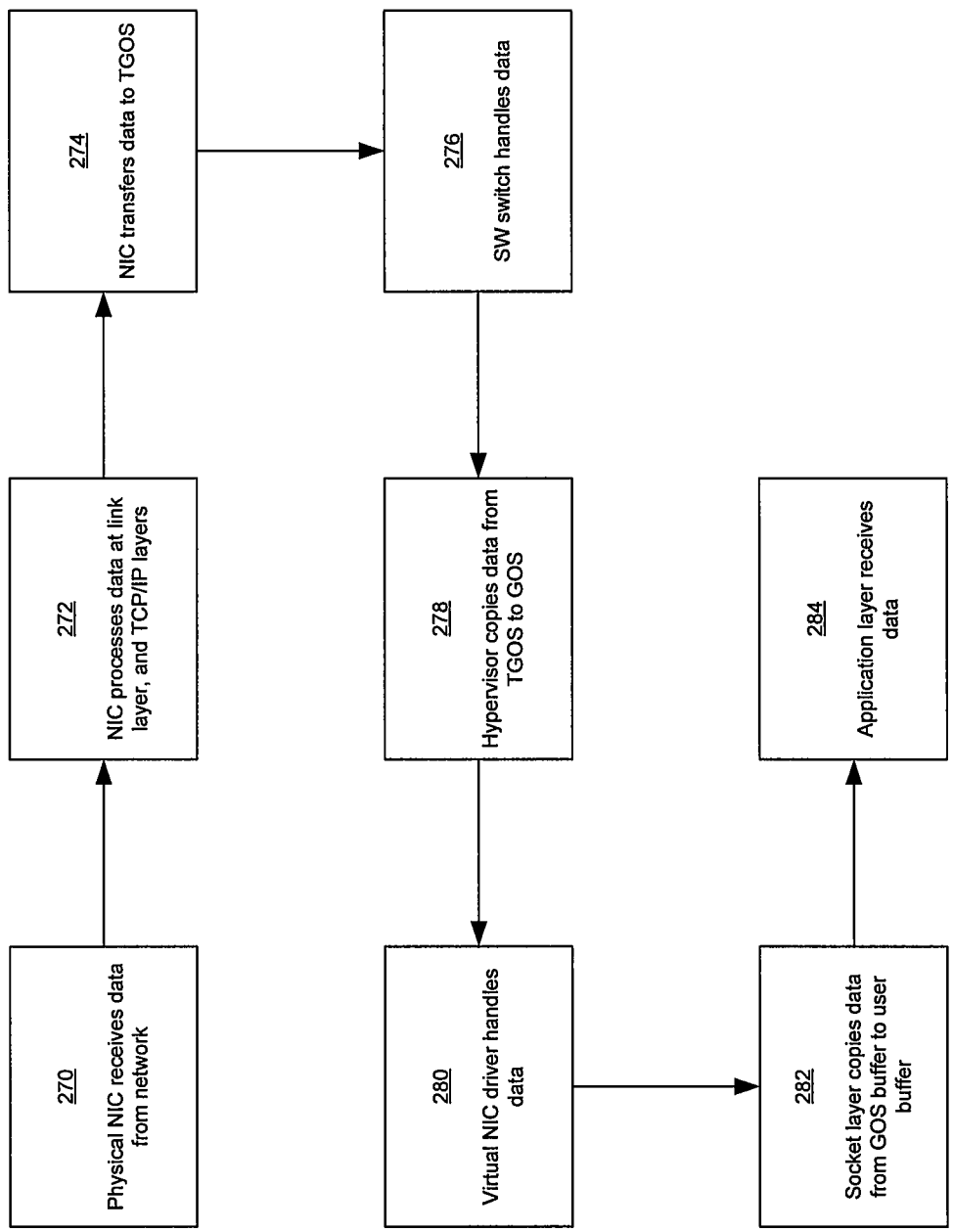
FIG. 2C is a flow diagram illustrating exemplary steps for receiving data from a network using protocol offload functionality with I/O sharing, in accordance with an embodiment of the invention.

FIG. 2C is a flow diagram illustrating exemplary steps for receiving data from a network using protocol offload functionality with I/O sharing, in accordance with an embodiment of the invention. Referring to FIG. 2C, there is shown steps 270 to 284. In step 270, the NIC 240 may receive a packet from the network. In step 272, the NIC 240 may process the received packet, which may include the link layer block 244 verifying that the packet should be received by the NIC 240. The link layer block 244 may also remove, for example, the Ethernet information to form an IP packet. The link layer block 244 in the NIC 240 may also reassemble a plurality of received Ethernet packets to one IP packet in instances where the plurality of received Ethernet packets is a result of segmentation of one IP packet by the sending network node.

The resulting IP packet may be processed by the TCP/IP layer block 242. The TCP/IP layer block 242 in the NIC 240 may parse the TCP and IP information to reassemble data in a plurality of IP packets to one TCP packet in instances where the plurality of received Ethernet packets is a result of segmentation of one IP packet by the sending network node. The NIC 240 may also determine a GOS that the received data may be communicated to.

In step 274, the NIC 240 may transfer the received data to the receive buffer 238, and may indicate to the physical NIC driver 234 that data is present in the receive buffer 238. In step 276, the physical NIC driver 234 may alert the software switch 232 of data in the receive buffer 238. Accordingly, the software switch 232 may copy the data in the receive buffer 238 to the TGOS buffer 236, which may be, for example, an appropriate TGOS buffer for the GOS 210.

In step 278, the data in the TGOS buffer 236 may be copied to the hypervisor 245. The hypervisor 245 may also invoke a context switch to the GOS 210 that is a destination for data received from the network. In step 280, the virtual NIC driver 216 may copy the data from the hypervisor 245 the data in the GOS buffer 222. In step 282, the socket layer 214 may copy the data from the GOS buffer 222 to the user buffer 220. In step 284, the application layer 212 may have access to the data in the user buffer 220.

Figure 3A:
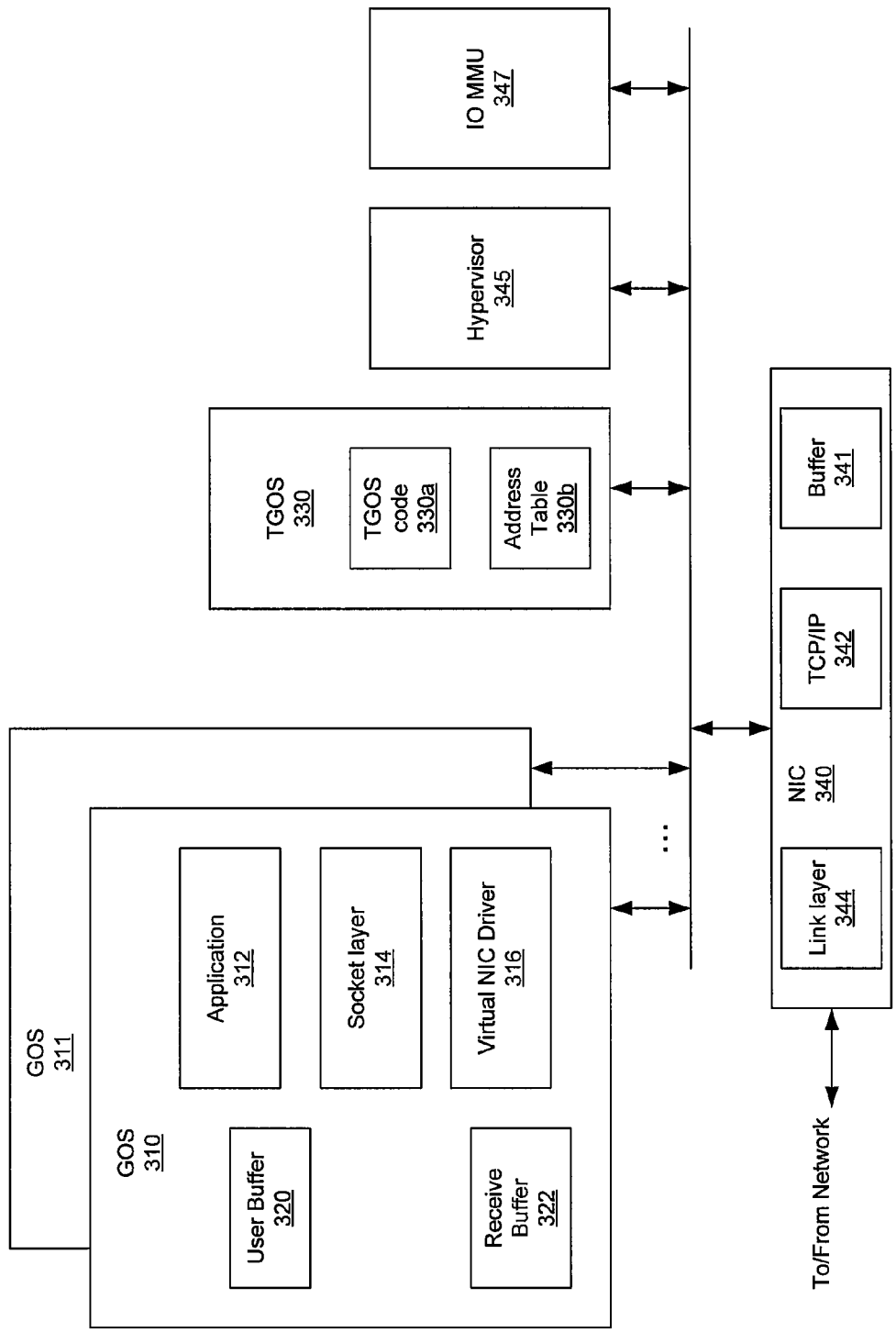
FIG. 3A is a block diagram illustrating exemplary zero copy functionality, in accordance with an embodiment of the invention.

FIG. 3A is a block diagram illustrating exemplary zero copy functionality, in accordance with an embodiment of the invention. Referring to FIG. 3A, there is shown GOSs 310 . . . 311, a TGOS 330, a NIC 340, a hypervisor 345, and an I/O MMU 347. The GOSs 310 . . . 311 may each comprise an application layer 312, a socket layer 314, and a virtual NIC driver 316. A user buffer 320 and a receive buffer 322 may be allocated, for example, by each of the GOSs 310 . . . 311, the TGOS 330, and/or the hypervisor 345, for use by the GOSs 310 . . . 311. Accordingly, the GOSs 310 . . . 311 may logically and/or physically comprise the user buffer 320 and the receive buffer 322. The GOSs 310 . . . 311 may be similar to the GOSs 102*a*, 102*b*, or 102*c* described with respect to FIG. 1A. The GOSs 310 . . . 311 may share a common resource, for example, the NIC 340.

The application layer 312 may comprise suitable applications that a user may use, such as, for example, an email application program or a web-browsing program. The socket layer 314 and the virtual NIC driver 316 may comprise suitable code that may enable transfer of data between the GOSs 310 . . . 311 and the NIC 340. The user buffer 320 and the receive buffer 322 may be a part of the host memory 120, for example. Alternatively, the receive buffer 322 may be, for example, a hardware buffer.

The TGOS 330 may comprise suitable logic, circuitry, and/or code that may enable support of a plurality of GOSs that transmit and/or receive data from the network. The TGOS 330 may comprise TGOS code 330*a* that may, for example, enable allocation of buffers for use by the GOSs. The allocated buffers may be, for example, the user buffer 320 and/or the receive buffer 322. The TGOS 330 may also comprise an address translation table 330*b* that may enable translation of an offset index or a virtual address for a buffer to a physical address for the buffer. FIG. 4A illustrates an exemplary address table. The address translation table 330*b* may comprise addresses for a pool of buffers, where the buffers may be part of the host memory 120, for example. The buffers and queues may be allocated at power up from, for example, the host memory 120, and/or dynamically from the host memory 120 while the GOSs and the hypervisor may be operating.

The NIC 340 may comprise suitable logic, circuitry, and/or code that may process data from a GOS for transmission to the network, or process data received from the network for transfer to an application layer. The NIC 340 may also comprise a NIC buffer 341, a TCP/IP layer block 342, and a link layer block 344. The NIC buffer 341 may be used to store data that may be received from the network and/or data that may be transmitted to the network. The NIC buffer 341 may be similar, for example, to the TX queues 108b, 112b, and 114b, and/or the RX queues 108c, 112c, and 114c.

The TCP/IP layer block 342 may comprise suitable logic, circuitry, and/or code that may be utilized to process data transmitted and/or received from the network with respect to TCP/IP protocols. The link layer block 344 may comprise suitable logic, circuitry, and/or code that may be utilized, for example, to process data for Ethernet link layer protocol before being transmitted to an Ethernet network. Data received from, for example, the Ethernet network may also be processed by the link layer block 344.

The hypervisor 345 may comprise suitable logic, circuitry, and/or code that may enable coordinating control of data being received from or transmitted to the network, and for allocation of resources. Resources allocated may comprise, for example, various buffers for the plurality of GOSs and the NIC 340. For example, the buffers may be allocated at power up from the host memory 120 and dynamically from the host memory 120 while the GOS 310, the TGOS 330, and/or the NIC 340 may be operating. The hypervisor 345 may receive requests for buffers from the socket layer 314 and may route the received requests to the TGOS 330. The TGOS 330 may then allocate a buffer and optionally map and pin it in to physical memory. A value corresponding to the allocated buffer may be sent to the hypervisor 345. The hypervisor 345 may then communicate a value corresponding to the allocated buffer to the socket layer 314. The value may be an offset index, a virtual address, or a physical address of the buffer.

The I/O MMU 347 may comprise suitable logic, circuitry, and/or code that may enable translation of virtual address to a physical address. Accordingly, a device, for example, the NIC 340 may address a memory location with a virtual memory address. The virtual memory address may be intercepted by the I/O MMU 347, and the I/O MMU 347 may translate the virtual memory address to a physical memory address. The I/O MMU 347 may output the physical memory address to an address bus coupled to the host physical memory. The NIC 340 may then access data at the location of the physical memory address. The NIC 340 may also request that the I/O MMU 347 send the translated physical address to the NIC 340. The NIC 340 may then directly access the physical address location. The NIC 340 may also retain the translation for future use.

In other embodiments of the invention, the NIC 340 may also comprise, for example, I/O MMU functionality. The NIC controlled I/O MMU may comprise suitable logic, circuitry, and/or code that may enable translation of virtual address to a physical address. Accordingly, a driver may present to the NIC 340 a virtual address, for example, and the NIC 340, in coordination with the TGOS 330 and/or hypervisor 345 may employ a table of addresses more frequently used for network operation. This table may be smaller and require less hierarchy than for a generic I/O MMU. Furthermore, the chances of a successful caching of its content in a smaller footprint may be much higher. The virtual memory address may be intercepted by the NIC 340 which may use its I/O MMU, to translate the virtual memory address to a physical memory address. The I/O MMU may output the physical memory address to the NIC 340 which in turn may use it when accessing memory on the bus that may be coupled to the host, such as, for example, PCI Express. The NIC 340 may flag the address as a physical address, thus not requiring further translation by the host based I/O MMU, and may save translation time.

In operation, a privileged entity, such as, for example, the TGOS 330 and/or the hypervisor 345, may indicate to the NIC 340 how to translate addresses that may be communicated by the GOSs 310 . . . 311. Accordingly, the NIC 340 may be able to set up translation tables. Accordingly, a direct channel may be set up between each of the GOSs 310 . . . 311 and the NIC 340, where the NIC 340 may be able to transfer data directly between itself and each of the GOSs 310 . . . 311 directly. In an embodiment of the invention, the translation table may be, for example, the address translation table 330b. Other embodiments of the invention may place the translation table in the hypervisor 345 and/or the NIC 340, and/or shared and/or cached by the NIC. Additionally, the NIC 340 may also program the I/O MMU 347 to translate addresses. Other embodiments of the invention may place the I/O MMU 347 functionality in the NIC 340, for example. Accordingly, the NIC 340 may be able to receive buffer addresses from the GOSs 310 . . . 311, and may be able to translate the address as needed.

An application layer, for example, the application layer 312 in the GOS 310, may have data to be transmitted to the network. The data may be in the user buffer 320. The socket layer 314 may indicate a value corresponding to the user buffer 320 to the virtual NIC driver 314. The value may be an offset index to a buffer, a virtual address to the buffer, or a physical address to the buffer. The specific addressing implementation may be design dependent. The socket layer 314 may also provide an indication to the hypervisor 345 of presence of data in the user buffer 320 that is to be transmitted to the network. The hypervisor 345 may allocate resources, such as, for example, the NIC 340, to the GOS 310 to allow transmission of data in the user buffer 320.

The virtual NIC driver 316 may provide an indication of an address of the user buffer 320 to the NIC 340. If the address of the user buffer 320 is a physical address, the NIC 340 may copy the data from the user buffer 320 to, for example, the NIC buffer 341. Otherwise, if the address of the user buffer 320 is not a physical address, the NIC 340 may translate the address to a physical address. The translation may be accomplished, for example, via the address translation table 330b, or via the I/O MMU 347. FIG. 4C describes access to the GOS buffer 322 by the NIC 340. Copying of the data to the NIC 340 may be achieved via, for example, a programmed I/O or DMA transfer.

The TCP/IP layer block 342 in the NIC 340 may generate a TCP packet by appending a TCP header to the data from the TGOS 330. The TCP/IP layer block 342 may generate an IP packet from the TCP packet by appending an IP header to the TCP packet. If the TCP packet is larger than an allowed size for a payload of an IP packet, the TCP/IP layer block 342 may segment the TCP packet to a plurality of packets, and generate an IP packet from each segmented packet. An IP packet from the TCP/IP layer block 342 may then be encapsulated with appropriate link layer information by the link layer block 344 to generate, for example, an Ethernet packet. The link layer block 344 may segment the IP packet to a plurality of packets, and generate, for example, an Ethernet packet from each segmented packet. Each Ethernet packet generated by the link layer block 344 may be transmitted on to the network by the NIC 340.

Additionally, the NIC 340 may receive, for example, Ethernet packets from the Ethernet network. The received packets may be stored, for example, in the NIC buffer 341. The link layer block 344 may parse the link layer information from a received packet. If the link layer block 344 determines that the Ethernet packet reached the correct NIC, the Ethernet packet may be processed to yield an IP packet. Processing of the Ethernet packet may comprise determining whether a plurality of Ethernet packets may be reassembled to one IP packet. The resulting IP packet may be stored, for example, in the NIC buffer 341.

The TCP/IP layer block 342 may process the IP packets in the NIC buffer 341 to generate TCP packets. Processing the IP packets may comprise determining whether a plurality of IP packets may be reassembled to one TCP packet. The resulting TCP packet may be processed by the TCP/IP layer block 342 to form a data packet. The processing of the TCP packet may comprise removing a TCP header. The resulting data packet may be stored, for example, in the NIC buffer 341. The NIC 340 may also determine a particular GOS to which the received data may be communicated. The NIC 340 may notify the appropriate GOS by placing an event in, for example, the event queue 108a, 112a, or 114a.

The virtual NIC driver 316 may communicate with the NIC 340 to control the transfer of the data packet in, for example, the NIC buffer 341 to the receive buffer 322. For example, the virtual NIC driver 316 may communicate an address of the receive buffer 322 to the NIC 340. If the address for the receive buffer 322 is a physical address, the NIC 340 may use the physical address to transfer data from the NIC buffer 341 to the receive buffer 322. Otherwise, the NIC 340 may translate the buffer address from the virtual NIC driver 316 to a physical address via the address translation table 330b. The data transfer by the NIC 340 may occur via, for example, a programmed I/O or DMA transfer.

The NIC 340 may indicate to the virtual NIC driver 316 that data may be in the receive buffer 322. The virtual NIC driver 316 may alert the socket layer 314 that the receive buffer 322 may contain data. The socket layer 314 may copy the data in the receive buffer 322 to the user buffer 320. The application layer 312 may then access the data in the user buffer 320. Some embodiments of the invention may also allow the NIC 340 to transfer data directly from the NIC buffer 341 to the user buffer 320. For example, the virtual NIC driver 316 may communicate the address of the user buffer 320 to the NIC 340. The NIC 340 may, after appropriately translating the user buffer address if necessary, transfer the data in the NIC buffer 341 to the user buffer 320 via, for example, a DMA transfer.

Although an example of a TCP/IP layers was used for the protocol stack, the invention need not be so limited. For example, some embodiments of the invention may also be used for networks that use other protocol stacks, such as, for example, the Open System Interconnection (OSI) seven-layer network model. Other embodiments of the invention may comprise virtualization with a plurality of GOSs and a plurality of network layers implanted in hardware. For example, the hardware implementation of the OSI layers 5, 4, 3, and/or 2 may be in the network interface card/circuitry.

Additionally, while various functional blocks may have been described, the invention need not be so limited. Some embodiments of the invention may use other configurations. For example, functionality of the TGOS 330 and the hypervisor 345 may be combined to one functional block. Additionally, the socket layer 314 and the virtual NIC driver 316 may be a same functional block. Also, some embodiments of the invention may not use the receive buffer 322. Accordingly, the data from the network may be copied directly from the NIC buffer 341 to the user buffer 320.

Figure 3B:
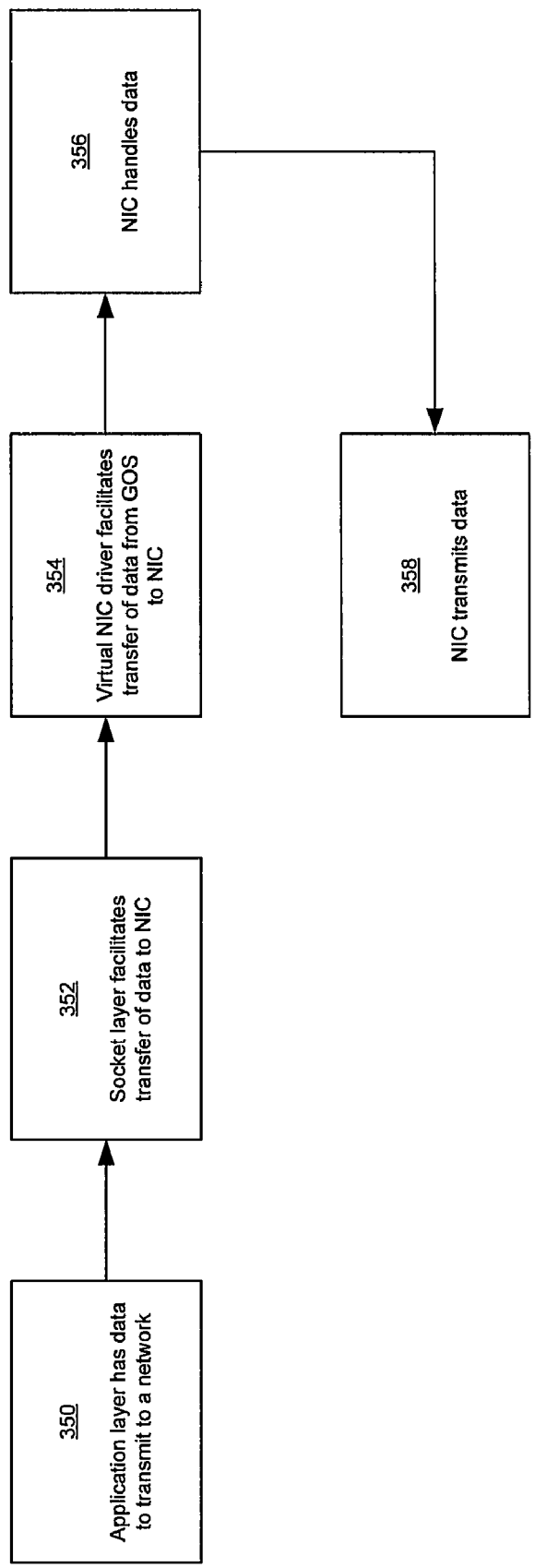
FIG. 3B is a flow diagram illustrating exemplary steps for transmitting data to a network using zero copy functionality, in accordance with an embodiment of the invention.

FIG. 3B is a flow diagram illustrating exemplary steps for transmitting data to a network using zero copy functionality, in accordance with an embodiment of the invention. Referring to FIG. 3B, there is shown steps 350 to 358. In step 350, an application layer, for example, the application layer 312 in the GOS 310, may have data to transmit to the network. The data may be placed in the user buffer 320 by the application layer 312.

In step 352, the socket layer 314 may also indicate to the hypervisor 345 of presence of data in the user buffer 320 that is to be transmitted to the network. Accordingly, the hypervisor 345 may allocate resources that may be used to transmit the data, such as, for example, the NIC 340. The socket layer 314 may further communicate to the virtual NIC driver 316 an address of the user buffer 320. In step 354, the virtual NIC driver 316 may communicate to the NIC 340 the address of the user buffer 320. If the address of the user buffer 320 is a physical address, the NIC 340 may use the physical address to transfer data from the user buffer 320 to, for example, the NIC buffer 341. If the address of the user buffer 320 is not the physical address, the NIC 340 may use, for example, the address translation table 330b to find the physical address. The NIC 340 may then transfer, or copy, the data from the user buffer 320 to, for example, the NIC buffer 341. The data transfer by the NIC 340 may be achieved via, for example, a programmed I/O or DMA transfer.

In step 356, the NIC 340 may process the data for transmission via a network, such as, for example, the Internet. The processing may comprise TCP/IP layer processing by the TCP/IP layer block 342. The TCP/IP layer block 342 in the NIC 340 may, for example, process the data from the user buffer 320 to a TCP packet. The TCP/IP layer block 342 may further process the TCP packet to generate an IP packet. If the TCP packet is larger than an allowed size for an IP packet, the TCP/IP layer block 342 may segment the TCP packet to a plurality of packets, and generate an IP packet from each of the segmented TCP packets.

The processing may also comprise link layer processing by the link layer block 344. The link layer processing may comprise, for example, the link layer block 344 generating an Ethernet packet for each IP packet. However, if an IP packet is larger than allowed for an Ethernet packet, the link layer block 344 may segment an IP packet to a plurality of packets and generate an Ethernet packet from each of the plurality of segmented IP packets. In step 358, the NIC 340 may transmit the Ethernet packets to the network.

Figure 3C:
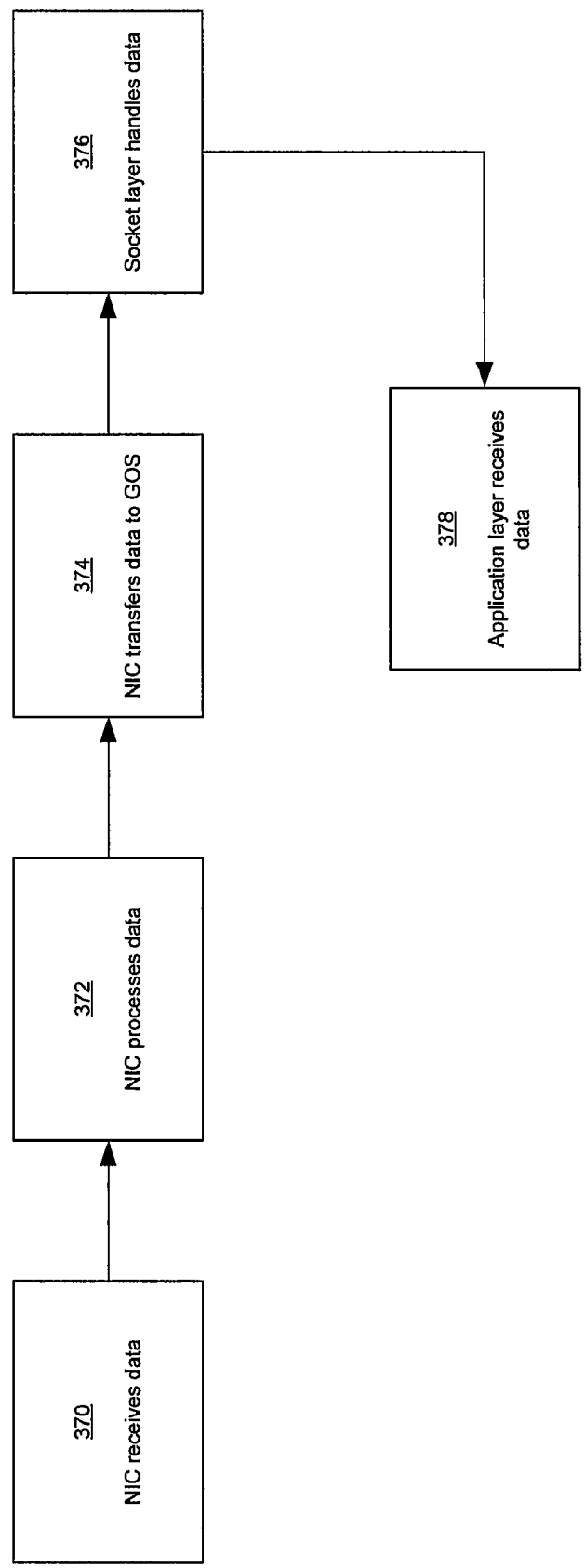
FIG. 3C is a flow diagram illustrating exemplary steps for receiving data from a network using zero copy functionality, in accordance with an embodiment of the invention.

FIG. 3C is a flow diagram illustrating exemplary steps for receiving data from a network using zero copy functionality, in accordance with an embodiment of the invention. Referring to FIG. 3C, there is shown steps 370 to 378. In step 370, the NIC 340 may receive a packet from a network, for example, the Internet using Ethernet protocol for the link layer protocol. In step 372, the NIC 340 may process the received Ethernet packet. The processing may comprise the link layer block 344 verifying that the Ethernet packet should be received by the NIC 340. The processing may also comprise generating an IP packet from one Ethernet packet, or from a plurality of Ethernet packets.

The link layer block 344 may parse information in the Ethernet header in order to determine whether a plurality of Ethernet packets may be reassembled to form an IP packet. If the Ethernet packets do not need to be reassembled, the link layer block 344 may generate an IP packet by, for example, removing the Ethernet specific information from an Ethernet packet. If the Ethernet packets do need to be reassembled, the link layer block 344 may remove the Ethernet specific information from the Ethernet packets, and concatenate the resulting packets to generate an IP packet. The resulting IP packet may be stored, for example, in the NIC buffer 341.

The TCP/IP layer block 342 may further process the IP packets in the NIC buffer 341. The TCP/IP layer block 342 in the NIC 340 may parse the IP headers of IP packets to generate TCP packets. If an IP packet does not need to be reassembled, then a TCP packet may result from processing of one IP packet. If a plurality of IP packets need to be reassembled, then one TCP packet may result from processing a plurality of IP packets. The TCP packets may be stored, for example, in the NIC buffer 341. The TCP/IP block 342 may process the TCP packets in the NIC buffer 341. The TCP/IP layer block 342 may remove the TCP headers of the TCP packets to generate data packets. The data packets may be stored, for example, in the NIC buffer 341.

The NIC 340 may also determine which particular GOS should be the recipient of the data received from a network. The particular GOS may be notified of the received data by the NIC 340 when the NIC 340 places an event in, for example, the event queue 108a, 112a, or 114a. In step 374, the NIC 340 may transfer a data packet in the NIC buffer 341 to, for example, the receive buffer 322 of the GOS 310. The virtual NIC driver 316 may have communicated to the NIC 340 an address of the receive buffer 322. The virtual NIC driver 316 may have received the address of the receive buffer 322 from the socket layer 314.

If the address for the receive buffer 322 is a physical address, the NIC 340 may use the physical address to transfer data from the NIC buffer 341 to the receive buffer 322. Otherwise, the NIC 340 may translate the address for the receive buffer 322 to a physical address via, for example, the address translation table 330b. The data transfer by the NIC 340 may be achieved via, for example, a programmed I/O or DMA transfer. The NIC 340 may provide an indication to the virtual NIC driver 316 that a data packet may be in the receive buffer 322. The virtual NIC driver 316 may then alert the socket layer 314 that the receive buffer 322 may contain a data packet. In step 376, the socket layer 314 may copy the data packet from the receive buffer 322 to the user buffer 320. In step 378, the application layer 312 may have access to data in the data packet in the user buffer 320.

FIG. 4A is an exemplary diagram of an address translation table, in accordance with an embodiment of the invention. Referring to FIG. 4A, there is shown an address translation table 475, which may be the address translation table 330b, for example. The address translation table 475 may comprise a plurality of address translation rows 475a, 475b, . . . , 475c, 475d that may be used to determine a physical address from a virtual address. Each address translation row may comprise, for example, a virtual tag (V-TAG) field 476 and the physical address (PA) field 477 for a particular buffer.

Each address translation row may also comprise other fields, such as, for example, a buffer size field and a in-use field. The buffer size field may indicate a size of the buffer. The in-use field may indicate whether a particular buffer may be used. For simplicity, only the V-TAG field 476 and the PA field 477 may be described. For additional simplicity, all buffers may be assumed to be equal size, and the buffer size may be known to various functionalities, such as, for example, GOSs, a TGOS, a hypervisor, and a NIC. Notwithstanding, the invention is not limited in this regard, and buffers of different sizes may be utilized. A GOS may initially, or as needed, request a number of buffers. The TGOS may allocate the requested buffers and may update the address translation table 475 appropriately. The buffers may be allocated, for example, from the host memory 120.

The V-TAG field 476 may comprise an offset index for a particular buffer in a pool of buffers. For example, if the address translation table 475 comprises 100 buffers, the offset in the V-TAG field 476 may range from a value of 0 to a value of 99. Accordingly, if the NIC 340, for example, is given an index of 49 by the virtual NIC driver 316, the NIC 340 may search the address translation table 475 for the offset index 49 in the V-TAG field 476. The search may be executed, for example, by the NIC processor 118. The NIC processor 118 may then read the physical address in the PA field 477 that may correspond to the offset index 49. The physical address, which may indicate a start address of the buffer, may be used to access the buffer.

Some embodiments of the invention may have a guest physical address in the PA field 477. In this regard, the guest physical address may then be used to determine the physical address of a buffer. Still other embodiments of the invention may use a guest physical address in the V-TAG field 476, and the corresponding address in the PA field 477 may be a physical address.

Figure 4B:
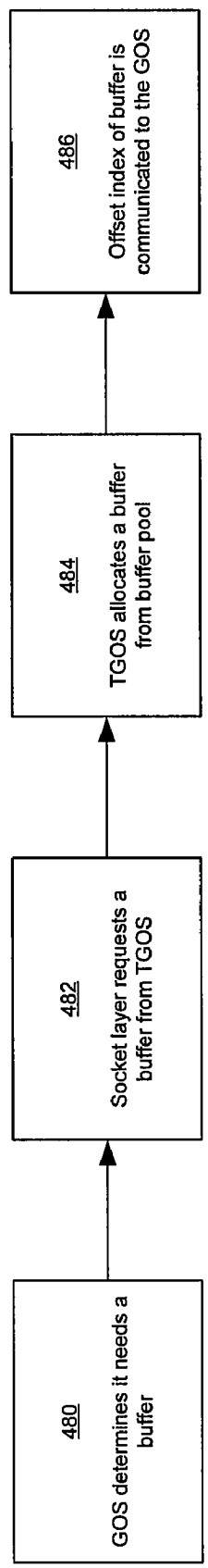
FIG. 4B is a flow diagram illustrating exemplary steps for allocating a buffer to a GOS, in accordance with an embodiment of the invention.
Figure 4C:
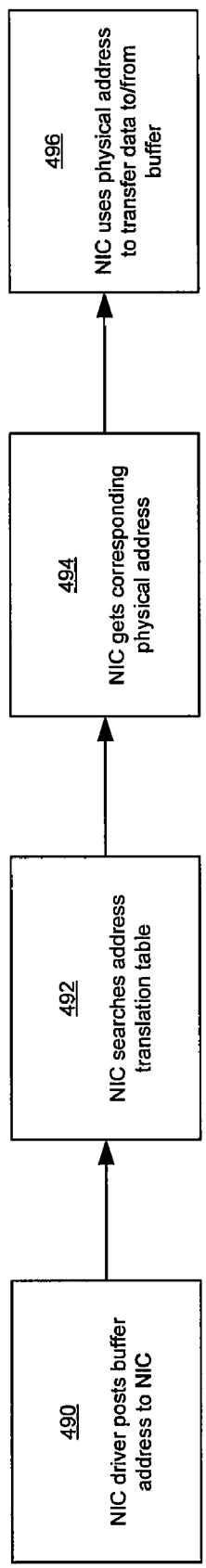
FIG. 4C is a flow diagram illustrating exemplary steps for a NIC accessing a GOS buffer, in accordance with an embodiment of the invention.

FIG. 4B is a flow diagram illustrating exemplary steps for allocating a buffer to a GOS, in accordance with an embodiment of the invention. Referring to FIG. 4B, there is shown steps 480 to 486. In step 480, the socket layer 314 in the GOS 310 may determine that a GOS buffer is needed, for example, to copy data from the user buffer 320. In step 482, the socket layer 314 may request mapping and or pinning of a buffer from the TGOS. The request may be routed, for example, to the hypervisor 345, which may pass on the request to the TGOS 330. In step 484, the TGOS 330 may determine which buffers in the physical address space may be free, and may allocate at least one free buffer to the requesting GOS 310. In step 486, the buffer offset index may be communicated to the hypervisor 345, the latter of which may communicate the offset index to the socket layer 314. The socket layer 314 may then be able to copy data from the user buffer 320 to the newly allocated GOS buffer 322.

Other embodiments of the invention may use other buffer allocation schemes. For example, a GOS may initially request 100 buffers, and the TGOS may register the allocated buffers in an address translation table. The GOS may then keep track of the allocated buffers for various uses, such as, for example, GOS buffers and/or user buffers.

FIG. 4C is a flow diagram illustrating exemplary steps for a NIC accessing a GOS buffer, in accordance with an embodiment of the invention. Referring to FIG. 4C, there is shown steps 490 to 496. In step 490, the virtual NIC driver 316 may communicate a buffer address to the NIC 340. The TGOS 330 and/or the hypervisor 345 may be involved in setting the type of address being communicated between the GOS and the NIC. The NIC uses this to interpret the address provided by the GOS driver whether it is a GOS virtual address, a bus or DMA address, a V-TAG or a Physical address. If this address is a physical address, the NIC may use the address to access the buffer, for example, via a DMA process. The buffer may be, for example, the user buffer 320 when data is to be transferred from the GOS 310 to the NIC 340. The buffer may be, for example, the receive buffer 322 when data is to be transferred from the NIC 340 to the GOS 310.

In step 492, the NIC 340 may search the address translation table 330b to find the corresponding physical address for the buffer address. In step 494, the buffer address may match a V-TAG in the address translation table 330b. In step 496, the corresponding physical address for the V-TAG may be used to access the buffer for data transfer, such as, for example, a DMA data transfer.

In accordance with an embodiment of the invention, aspects of an exemplary system may comprise a NIC such as, for example, the NIC 110, the NIC 240, or the NIC 340. The NIC 110, 240, or 340 may be shared by a plurality of GOSs, such as, for example, the GOSs 102a . . . 102c, 210 . . . 211, or 310 . . . 311, respectively, to access a network. For example, the GOS 102a may access the network via the NIC 110, the GOS 210 may access the network via the NIC 240, and the GOS 310 may access the network via the NIC 340. A GOS such as the GOS 310, for example, may access the network via the NIC 340 when the NIC 340 switches communication to the GOS 310.

The GOS 310 may access the network to transfer data to and/or from other network nodes. The data transferred may be via, for example, a direct channel, where the NIC 340 may transfer data directly between itself and the GOS. Accordingly, the NIC 340 may receive data from the network and/or transmit data to the network. The data received from, or to be transmitted to, the network may be copied between a buffer for the NIC 340, for example, the NIC buffer 341, and a corresponding application buffer for a GOS, for example, the user buffer 320. The NIC 340 may access the application buffer 320 via a virtual address, a physical address, or a buffer offset index communicated to the NIC 340 by the GOS 310. A virtual address may be translated to a physical address via an address translation table, for example, the address translation table 330b or a memory management unit, for example, the I/O MMU 347. The offset index for a buffer may be translated to a physical address via, for example, the address translation table 330b.

The NIC may also offload network operations from, for example, the host system 122 and/or the GOSs 310 . . . 311. The network operations may comprise, for example, OSI layer 3, 4, and/or 5 protocol operations. The network operations may also comprise TCP operations and/or IP operations. The OSI layer 3, 4, and/or 5 protocol operations and/or the TCP and/or IP operations may be executed by, for example, the TCP/IP layer block 342. The NIC 340 may also execute link layer network protocol operations, which may be OSI layer 2 protocol operations. The link layer protocol operations may be executed by, for example, the link layer block 344.

Another embodiment of the invention may provide a machine-readable storage, having stored thereon, a computer program having at least one code section executable by a machine, thereby causing the machine to perform the steps as described above for protocol offload in a virtualized environment.

Accordingly, the present invention may be realized in hardware, software, or a combination of hardware and software. The present invention may be realized in a centralized fashion in at least one computer system, or in a distributed fashion where different elements are spread across several interconnected computer systems. Any kind of computer system or other apparatus adapted for carrying out the methods described herein is suited. A typical combination of hardware and software may be a general-purpose computer system with a computer program that, when being loaded and executed, controls the computer system such that it carries out the methods described herein.

The present invention may also be embedded in a computer program product, which comprises all the features enabling the implementation of the methods described herein, and which when loaded in a computer system is able to carry out these methods. Computer program in the present context means any expression, in any language, code or notation, of a set of instructions intended to cause a system having an information processing capability to perform a particular function either directly or after either or both of the following: a) conversion to another language, code or notation; b) reproduction in a different material form.

While the present invention has been described with reference to certain embodiments, it will be understood by those skilled in the art that various changes may be made and equivalents may be substituted without departing from the scope of the present invention. In addition, many modifications may be made to adapt a particular situation or material to the teachings of the present invention without departing from its scope. Therefore, it is intended that the present invention not be limited to the particular embodiment disclosed, but that the present invention will comprise all embodiments falling within the scope of the appended claims.

What is claimed is:

1. A method for communicating via a network, the method comprising:

establishing a direct channel between at least one of a plurality of guest operating systems (GOSs) and network interface circuitry, wherein said network interface circuitry is shared by said plurality of GOSs; and copying data directly between a buffer and a corresponding buffer for said at least one of said plurality of GOSs without copying said data to a trusted guest operating system (TGOS).

2. The method according to claim 1, comprising accessing said corresponding buffer for said at least one of said plurality of GOSs by translating a virtual address communicated by said at least one of said plurality of GOSs to a physical address.

3. The method according to claim 2, wherein said translation is accomplished via an address translation table managed by said network interface circuitry.

4. The method according to claim 2, wherein said translation is accomplished via an I/O memory management unit.

5. The method according to claim 2, wherein said translation is accomplished via an I/O memory management unit managed by said network interface circuitry.

6. The method according to claim 1, comprising accessing said corresponding buffer for said at least one of said plurality of GOSs by translating an offset index communicated by said at least one of said plurality of GOSs to a physical address.

7. The method according to claim 6, wherein said translation is accomplished via an address translation table managed by said network interface circuitry.

8. The method according to claim 1, comprising accessing said corresponding buffer for said at least one of said plurality of said GOSs via a physical address communicated by said at least one of said plurality of GOSs.

9. The method according to claim 1, comprising switching communication between said network interface circuitry and said at least one of said plurality of GOSs, wherein each of said plurality of GOSs accesses a network when said communication is switched to said at least one of said plurality of GOSs.

10. The method according to claim 1, comprising offloading network operations from a host system communicatively coupled to said network interface circuitry.

11. The method according to claim 1, comprising offloading network protocol operations from said plurality of GOSs to said network interface circuitry.

12. The method according to claim 1, comprising establishing a fastpath and a slowpath for said direct channel.

13. The method according to claim 1, comprising sharing one configuration space for said plurality of GOSs.

14. The method according to claim 1, comprising dedicating configuration space for each entity within said network interface circuitry that is dedicated to each of said plurality of GOSs.

15. A non-transitory computer-readable medium having stored thereon, a computer program having at least one code section for communicating via a network, the at least one code section being executable by a computer for causing the computer to perform steps comprising:

establishing a direct channel between at least one of a plurality of GOSs and network interface circuitry, wherein said network interface circuitry is shared by said plurality of GOSs; and copying data directly between a buffer and a corresponding buffer for said at least one of said plurality of GOSs without copying said data to a trusted guest operating system (TGOS).

16. The non-transitory computer-readable medium according to claim 15, wherein said at least one code section comprises code for accessing said corresponding buffer for said at least one of said plurality of GOSs by translating a virtual address communicated by said at least one of said plurality of GOSs to a physical address.

17. The non-transitory computer-readable medium according to claim 16, wherein said translation is accomplished via an address translation table managed by said network interface circuitry.

18. The non-transitory computer-readable medium according to claim 16, wherein said translation is accomplished via an I/O memory management unit.

19. The non-transitory computer-readable medium according to claim 16, wherein said translation is accomplished via an I/O memory management unit managed by said network interface circuitry.

20. The non-transitory computer-readable medium according to claim 15, wherein said at least one code section comprises code for accessing said corresponding buffer for said at least one of said plurality of GOSs by translating an offset index communicated by said at least one of said plurality of GOSs to a physical address.

21. The non-transitory computer-readable medium according to claim 20, wherein said translation is accomplished via an address translation table managed by said network interface circuitry.

22. The non-transitory computer-readable medium according to claim 15, wherein said at least one code section comprises code for accessing said corresponding buffer for said at least one of said plurality of said GOSs via a physical address communicated by said at least one of said plurality of GOSs.

23. The non-transitory computer-readable medium according to claim 15, wherein said at least one code section comprises code for switching communication between said network interface circuitry and said at least one of said plurality of GOSs, wherein each of said plurality of GOSs accesses a network when said communication is switched to said at least one of said plurality of GOSs.

24. The non-transitory computer-readable medium according to claim 15, wherein said at least one code section comprises code for offloading network operations from a host system communicatively coupled to said network interface circuitry.

25. The non-transitory computer-readable medium according to claim 15, wherein said at least one code section comprises code for offloading network protocol operations from said plurality of GOSs to said network interface circuitry.

26. The non-transitory computer-readable medium according to claim 15, wherein said at least one code section comprises code for establishing a fastpath and a slowpath for said direct channel.

27. The non-transitory computer-readable medium according to claim 15, wherein said at least one code section comprises code for sharing one configuration space for said plurality of GOSs.

28. The non-transitory computer-readable medium according to claim 15, wherein said at least one code section comprises code for dedicating configuration space for each entity within said network interface circuitry that is dedicated to each of said plurality of GOSs.

29. A system for communicating via a network, the system comprising:
one or more circuits and/or processors in network interface circuitry that are shared by a plurality of guest operating systems (GOSs);
said one or more circuits and/or processors are operable to establish a direct channel between at least one of said plurality of GOSs and said network interface circuitry; and
said one or more circuits and/or processors are operable to copy data directly between a buffer and a corresponding buffer for said at least one of said plurality of GOSs without copying said data to a trusted guest operating system (TGOS).

30. The system according to claim 29, wherein said one or more circuits and/or processors are operable to access said corresponding buffer for said at least one of said plurality of GOSs by translating a virtual address communicated by said at least one of said plurality of GOSs to a physical address.

31. The system according to claim 30, wherein said translation is accomplished via an address translation table managed by said network interface circuitry.

32. The system according to claim 30, wherein said translation is accomplished via an I/O memory management unit.

33. The system according to claim 30, wherein said translation is accomplished via an I/O memory management unit managed by said network interface circuitry.

34. The system according to claim 29, wherein said one or more circuits and/or processors are operable to access said corresponding buffer for said at least one of said plurality of GOSs by translating an offset index communicated by said at least one of said plurality of GOSs to a physical address.

35. The system according to claim 34, wherein said translation is accomplished via an address translation table managed by said network interface circuitry.

36. The system according to claim 29, wherein said one or more circuits and/or processors are operable to access said corresponding buffer for said at least one of said plurality of said GOSs via a physical address communicated by said at least one of said plurality of GOSs.

37. The system according to claim 29, wherein said one or more circuits and/or processors are operable to switch communication between said network interface circuitry and said at least one of said plurality of GOSs, wherein each of said plurality of GOSs accesses a network when communication is switched between said network interface circuitry and said at least one of said plurality of GOSs.

38. The system according to claim 29, wherein said one or more circuits and/or processors are operable to offload network operations from a host system communicatively coupled to said network interface circuitry.

39. The system according to claim 29, wherein said one or more circuits and/or processors are operable to offload network protocol operations from said plurality of GOSs.

40. The system according to claim 29, wherein said direct channel comprises a fastpath and a slowpath.

41. The system according to claim 29, comprising one configuration space that is shared by said plurality of GOSs.

42. The system according to claim 29, comprising a configuration space for each entity within said NIC that is dedicated to each of said plurality of GOSs.

* * * * *